(12) United States Patent
Lee et al.

(10) Patent No.: US 12,262,357 B2
(45) Date of Patent: Mar. 25, 2025

(54) METHOD AND DEVICE FOR SELECTING SL TRANSMISSION RESOURCE IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 391 days.

(21) Appl. No.: 17/775,256

(22) PCT Filed: Nov. 9, 2020

(86) PCT No.: PCT/KR2020/015642
§ 371 (c)(1),
(2) Date: May 6, 2022

(87) PCT Pub. No.: WO2021/091352
PCT Pub. Date: May 14, 2021

(65) Prior Publication Data
US 2022/0400484 A1  Dec. 15, 2022

Related U.S. Application Data

(60) Provisional application No. 62/937,224, filed on Nov. 18, 2019, provisional application No. 62/937,240, (Continued)

(51) Int. Cl.
*H04W 72/0446* (2023.01)
*H04W 72/20* (2023.01)
*H04W 92/18* (2009.01)

(52) U.S. Cl.
CPC ....... *H04W 72/0446* (2013.01); *H04W 72/20* (2023.01); *H04W 92/18* (2013.01)

(58) Field of Classification Search
CPC . H04W 72/0446; H04W 72/20; H04W 92/18; H04W 72/25; H04W 4/40; H04W 72/02
(Continued)

(56) References Cited

U.S. PATENT DOCUMENTS 11,632,215 B2 * 4/2023 Wang ................... H04L 5/0051
370/329
2020/0229171 A1 * 7/2020 Khoryaev ............... H04W 4/40
(Continued)

FOREIGN PATENT DOCUMENTS

KR      20190008387        1/2019

OTHER PUBLICATIONS

Vivo, "Discussion on mode 2 resource allocation mechanism," 3GPP TSG-RAN WG1 #98bis, R1-1911420, Oct. 2019, 16 pages.
(Continued)

*Primary Examiner* — Kwang B Yao
*Assistant Examiner* — Syed M Bokhari
(74) *Attorney, Agent, or Firm* — LEE, HONG, DEGERMAN, KANG & WAIMEY

(57) ABSTRACT

Proposed is an operation method of a first device (100) in a wireless communication system. The method may comprise the steps of: selecting a first resource, a second resource, a third resource, and a fourth resource; on the basis of at least one of the first resource, the second resource, the third resource, and the fourth resource, transmitting sidelink control information (SCI) through a physical sidelink control channel (PSCCH) to a second device (200); and on the basis of at least one of the first resource, the second resource, the third resource, and the fourth resource, transmitting a physical sidelink shared channel (PSSCH) to the second device (200).

11 Claims, 27 Drawing Sheets reserving/selecting one or more resources for SL transmission — S1710 performing SL transmission, using a reserved/selected resource — S1720

Related U.S. Application Data filed on Nov. 18, 2019, provisional application No. 62/933,362, filed on Nov. 8, 2019.

(58) Field of Classification Search
USPC .......................................................... 370/329
See application file for complete search history.

(56) References Cited

U.S. PATENT DOCUMENTS

| | | | |
|---|---|---|---|
| 2020/0245281 A1* | 7/2020 | Chae ..................... | H04L 27/26 |
| 2021/0176669 A1* | 6/2021 | Fakoorian ............. | H04W 72/20 |
| 2022/0377748 A1* | 11/2022 | He ..................... | H04W 72/542 |

OTHER PUBLICATIONS

Ericsson, "Resource allocation for Mode-2 transmissions," 3GPP TSG-RAN WG1 #98bis, R1-1910534, Oct. 2019, 17 pages.
Samsung, "On Resource Allocation for NR V2X Mode 2," 3GPP TSG-RAN WG1 #98bis, R1-1910471, Oct. 2019, 9 pages.
NTT Docomo, Inc., "Sidelink resource allocation mechanism mode 2 for NR V2X," 3GPP TSG-RAN WG1 #98bis, R1-1911170, Oct. 2019, 9 pages.
PCT International Application No. PCT/KR2020/015642, International Search Report dated Feb. 22, 2021, 5 pages.

* cited by examiner

FIG. 4
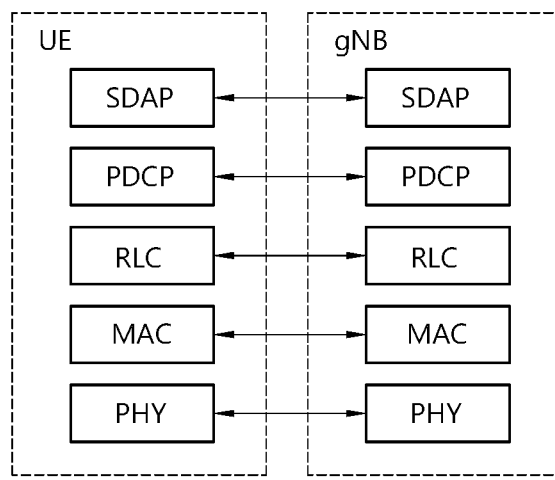
(a)
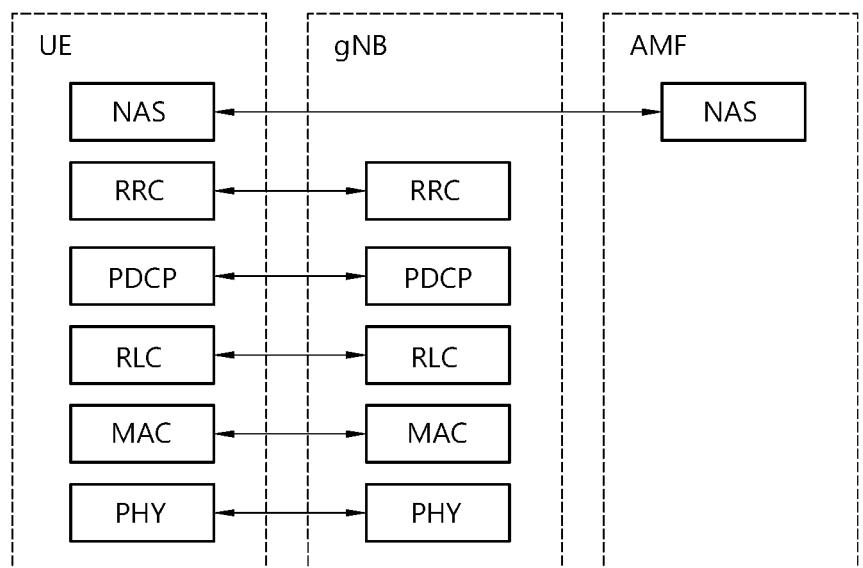
(b)

FIG. 8
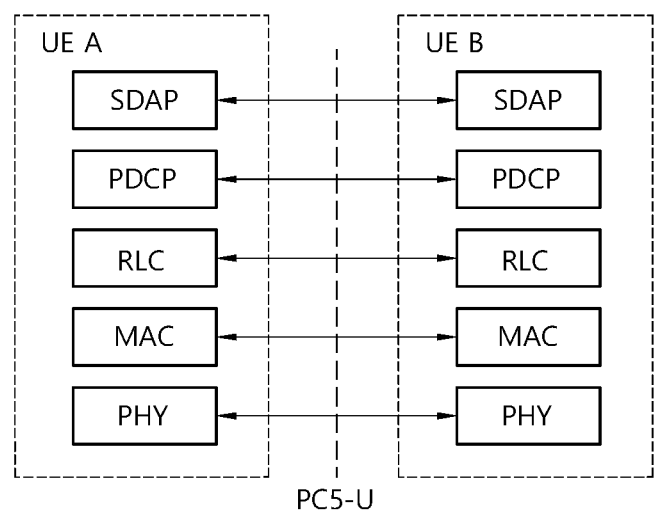
(a)
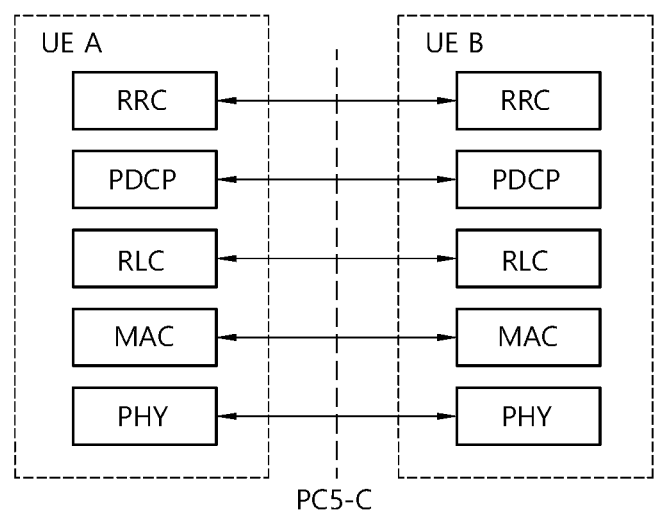
(b)

FIG. 12
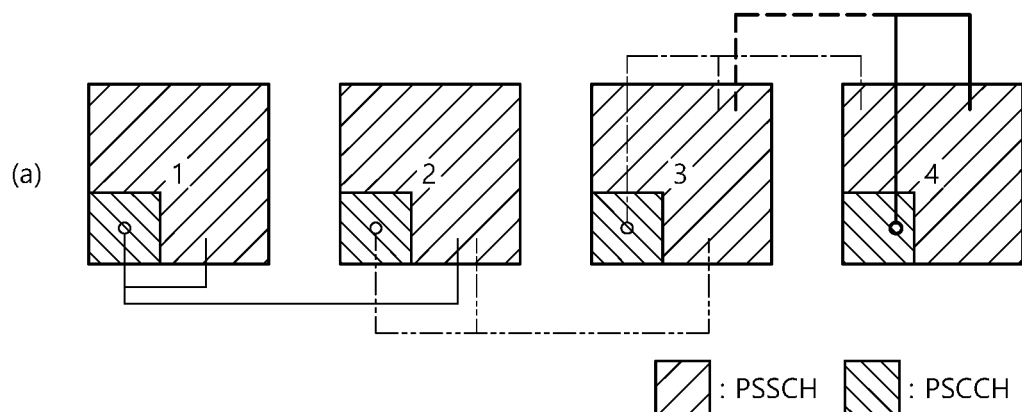
(a)
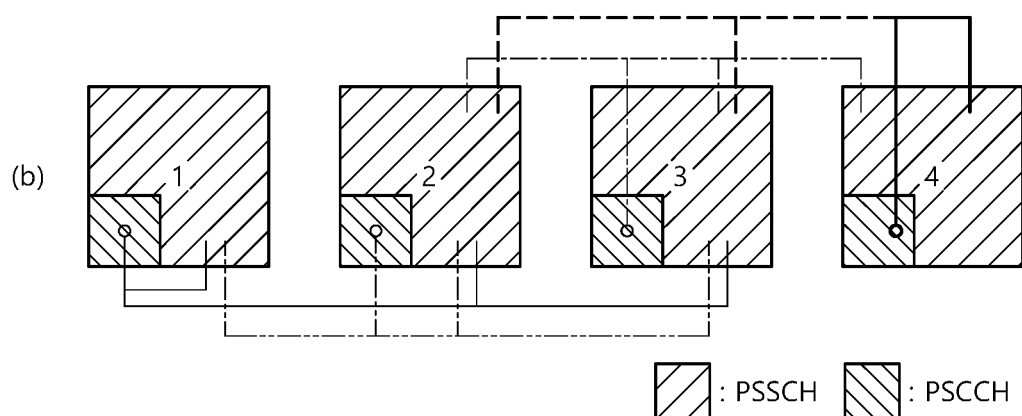
(b)
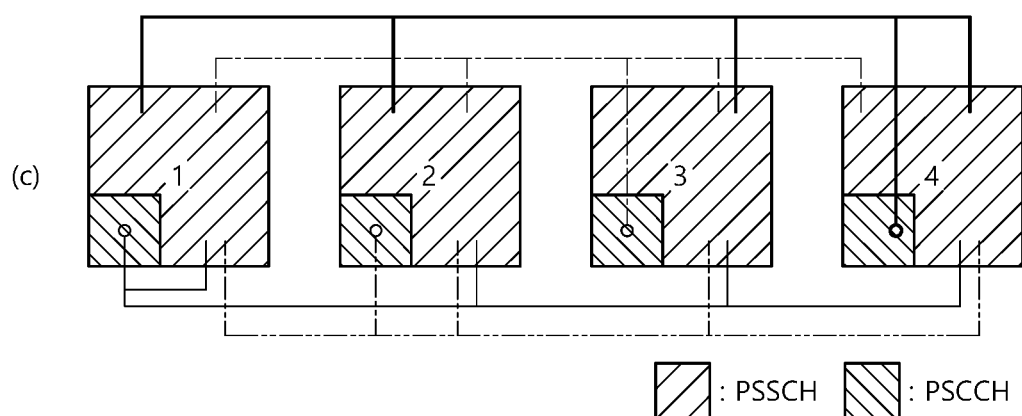
(c)

METHOD AND DEVICE FOR SELECTING SL TRANSMISSION RESOURCE IN NR V2X

CROSS-REFERENCE TO RELATED APPLICATIONS

This application is the National Stage filing under 35 U.S.C. 371 of International Application No. PCT/KR2020/015642, filed on Nov. 9, 2020, and claims the benefit of U.S. Provisional Application No. 62/933,362, filed on Nov. 8, 2019, 62/937,224, filed on Nov. 18, 2019, and 62/937,240, filed on Nov. 18, 2019, the contents of which are all incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Solutions

According to an embodiment, a method of operating a first apparatus 100 in a wireless communication system is proposed. The method may comprise: selecting a first resource, a second resource, a third resource, and a fourth resource; transmitting sidelink control information (SCI) to a second apparatus through a physical sidelink control channel (PSCCH), based on at least one of the first resource, the second resource, the third resource, or the fourth resource; and transmitting a physical sidelink shared channel (PSSCH) to the second apparatus, based on at least one of the first resource, the second resource, the third resource, or the fourth resource.

Effects of the Disclosure

The user equipment (UE) may efficiently perform SL communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

FIG. 12 shows a method in which a UE that has reserved transmission resource(s) informs another UE of the transmission resource(s), based on an embodiment of the present disclosure.

DESCRIPTION OF EXEMPLARY EMBODIMENTS

Figure 1:
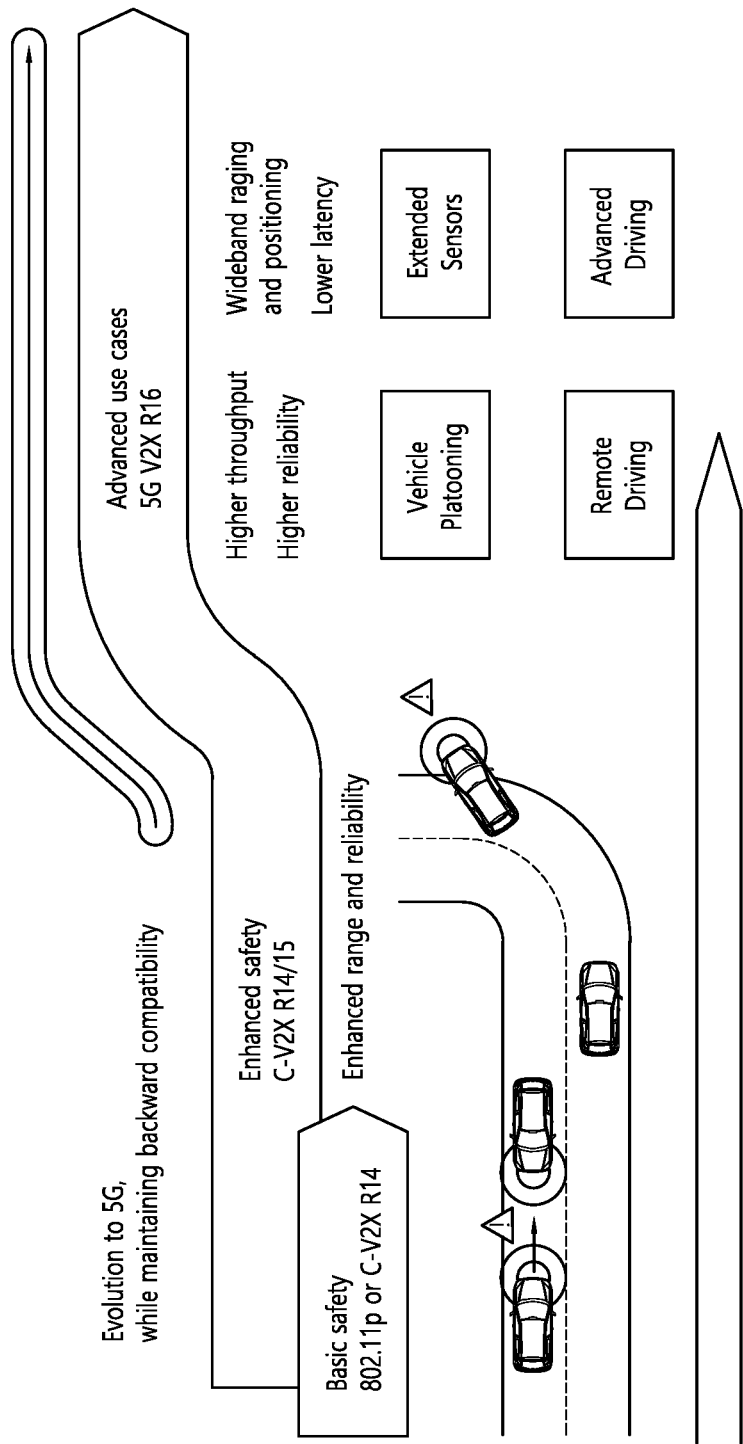
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
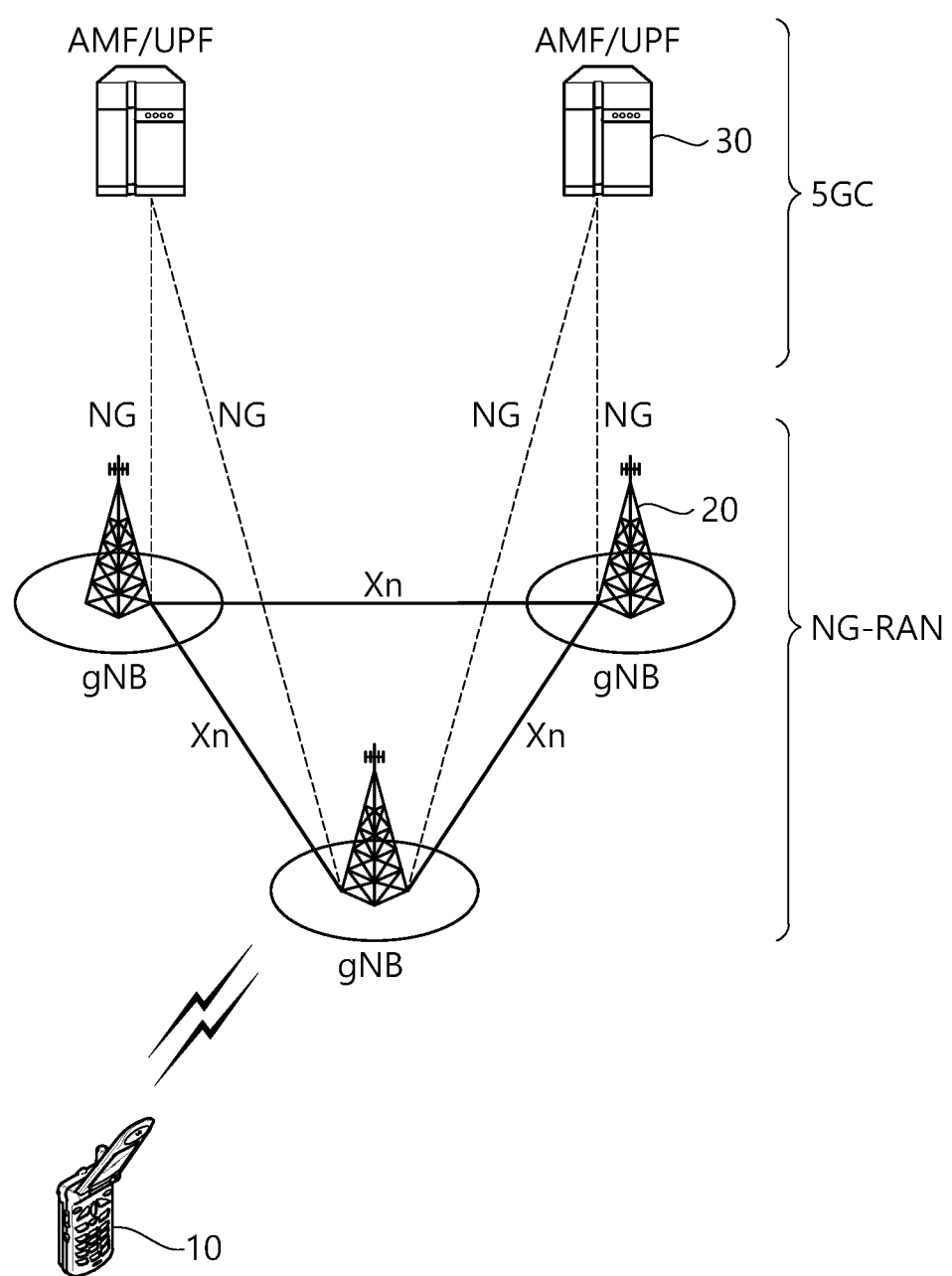
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
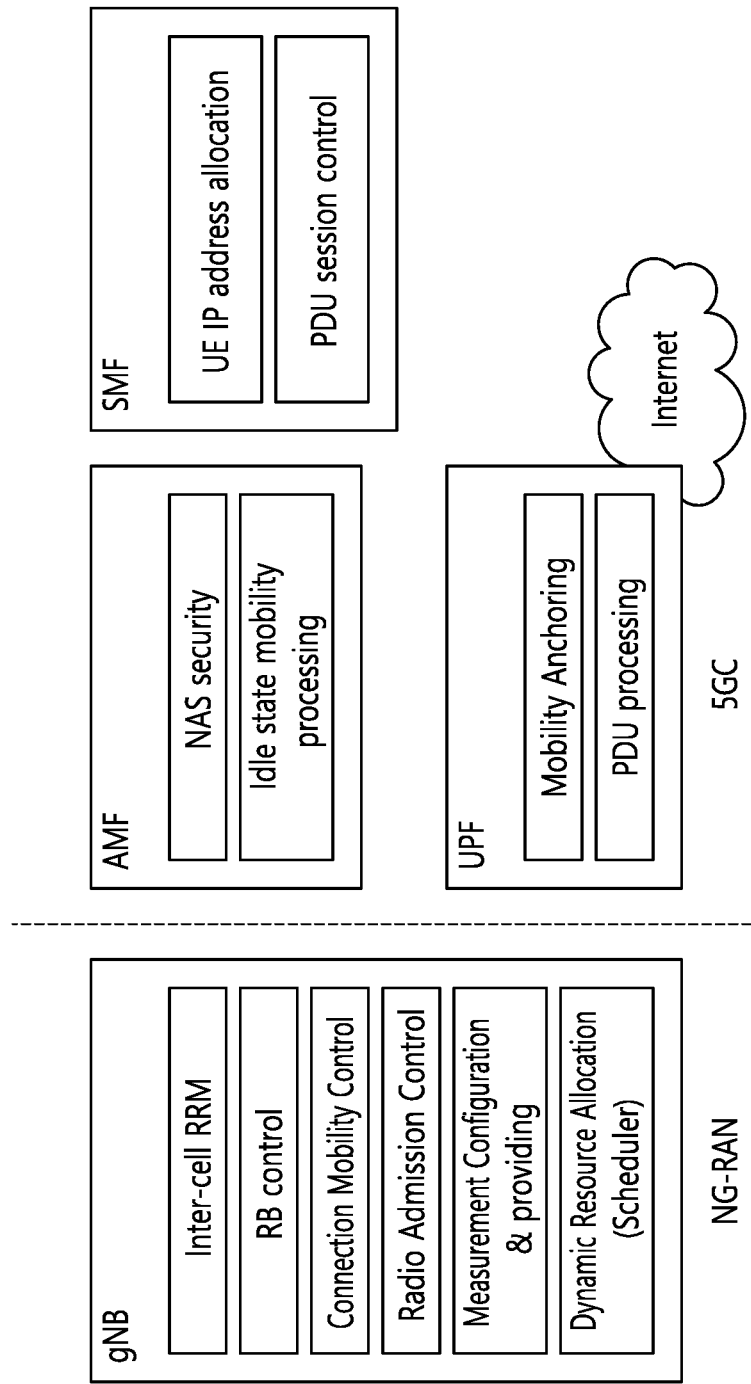
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
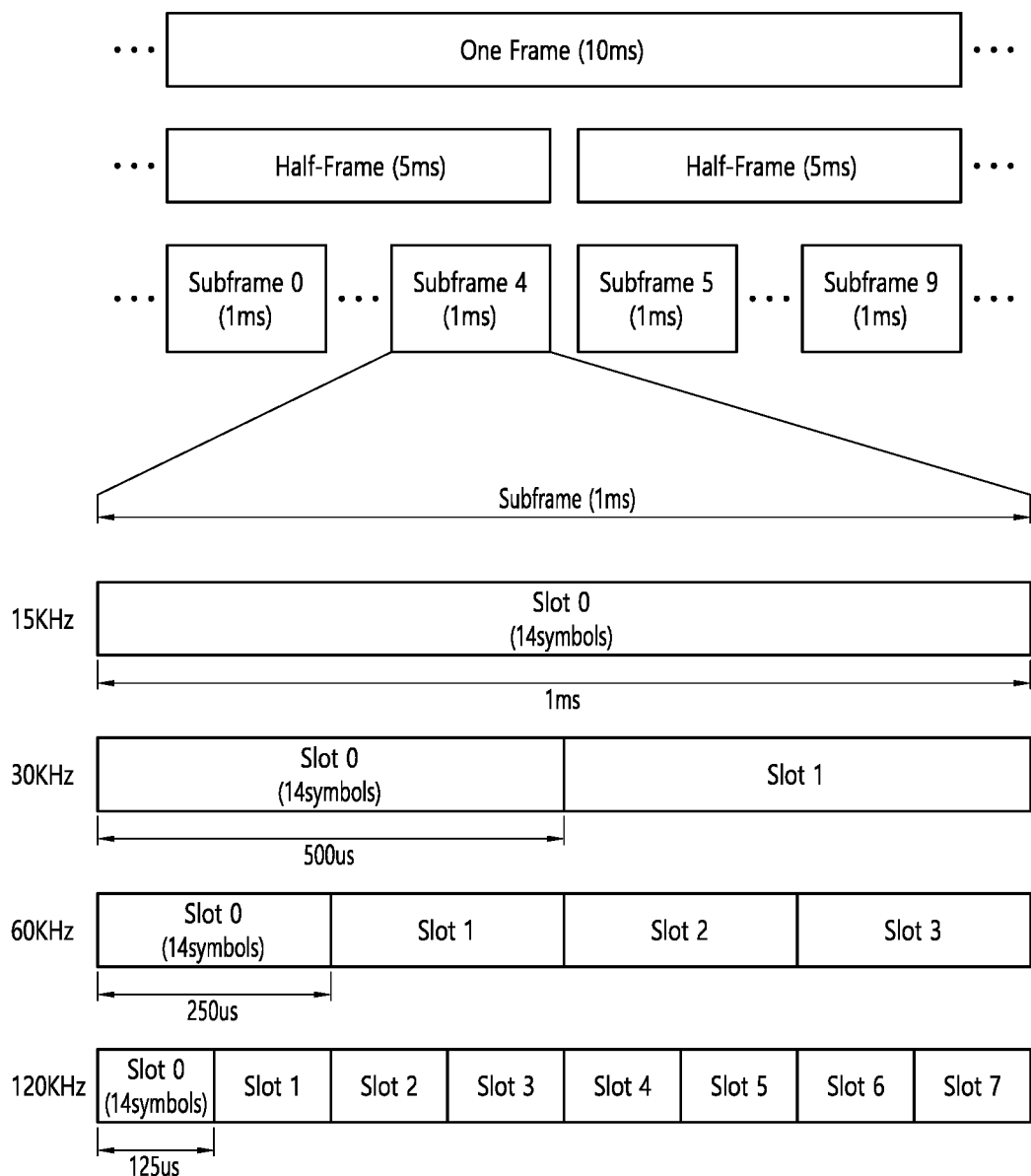
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{Subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| scs ($15*2^u$) | $N^{slot}_{symb}$ | $N^{frame,u}_{slot}$ | $N^{Subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125MHz | 15, 30, 60 kHz |
| FR2 | 24250 MHz-52600MHz | 60, 120, 240 kHz |

Figure 6:
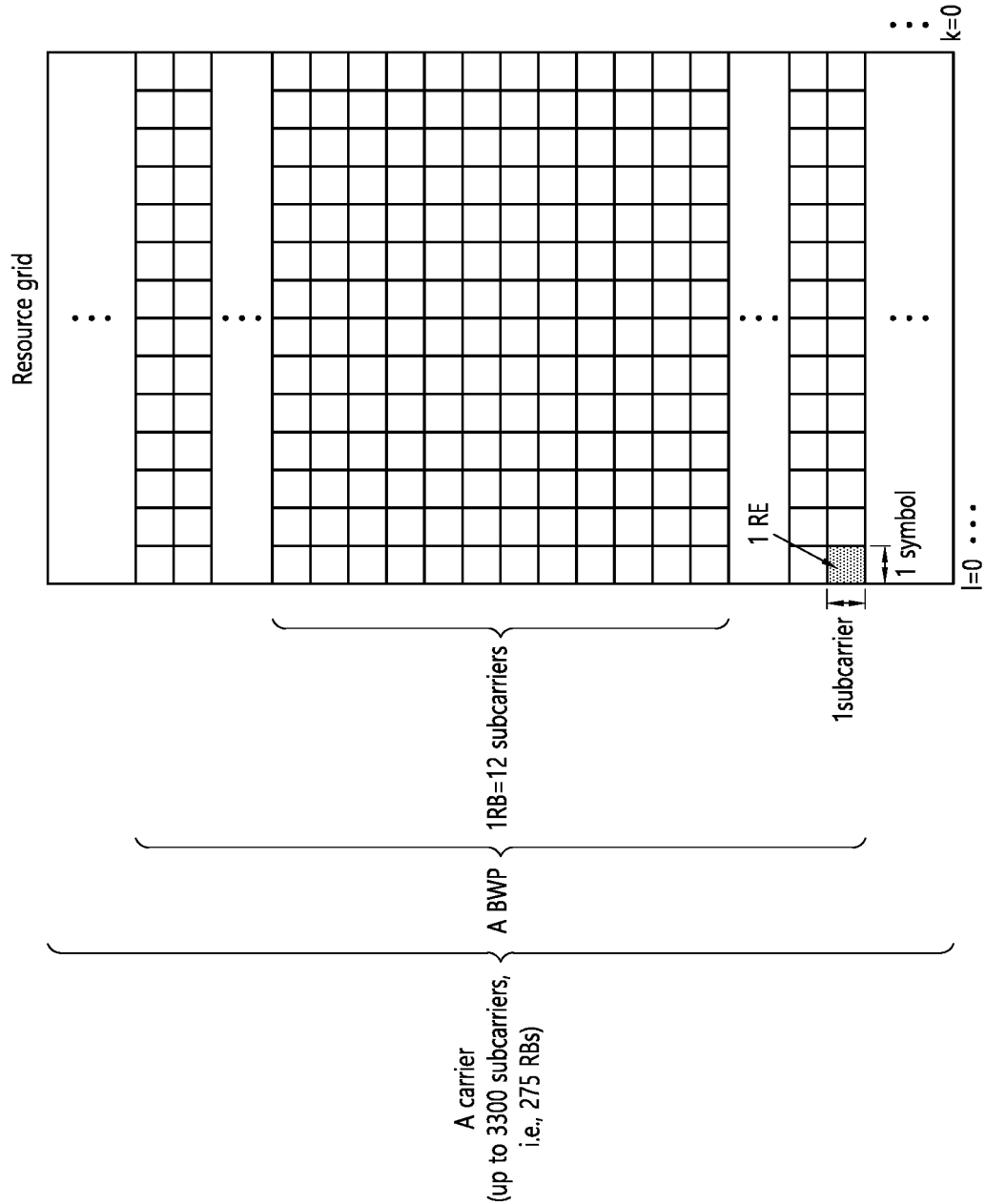
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
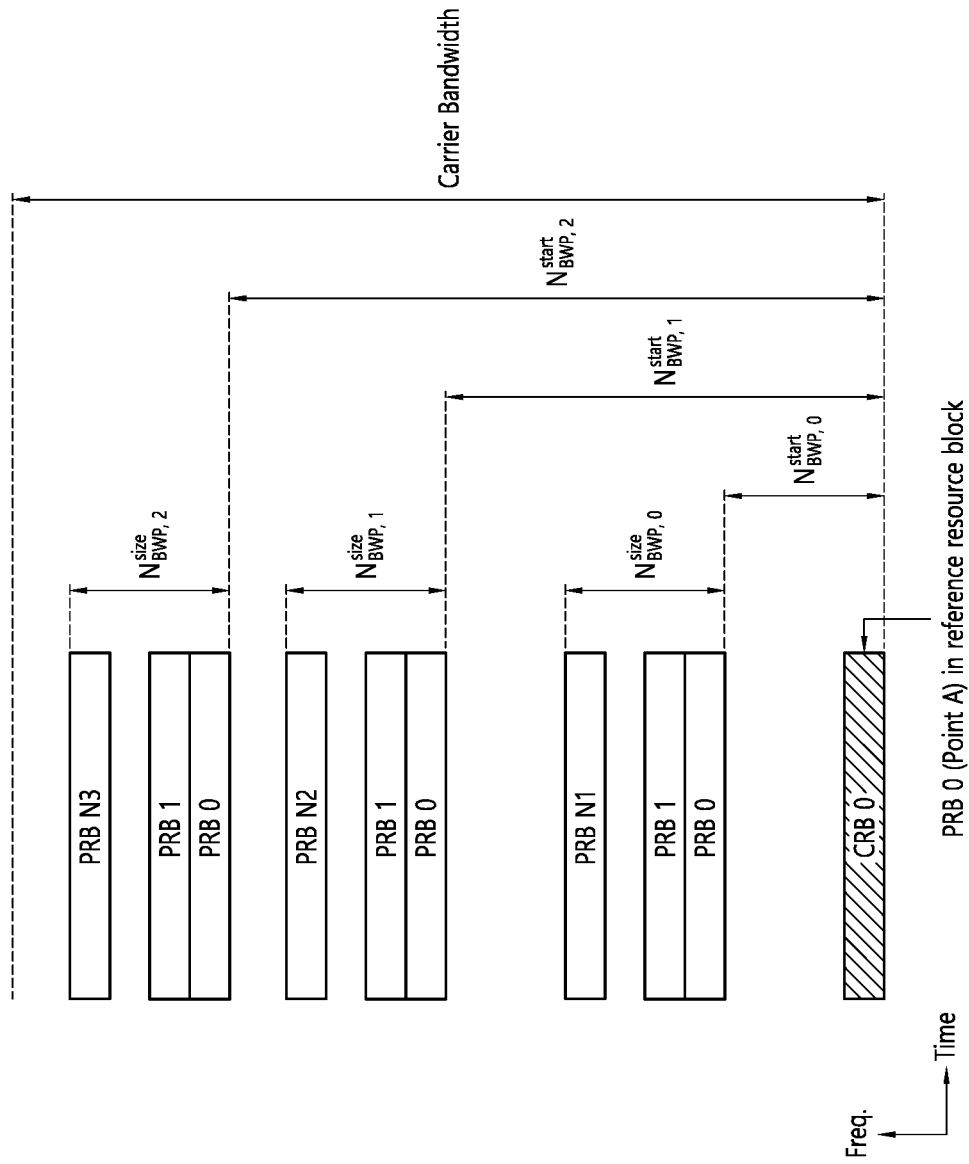
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(*a*) shows a user plane protocol stack, and FIG. 8(*b*) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
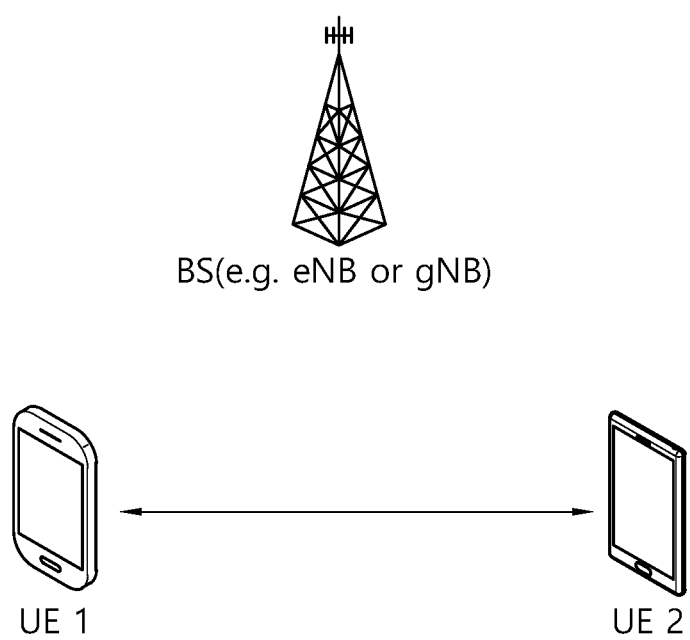
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
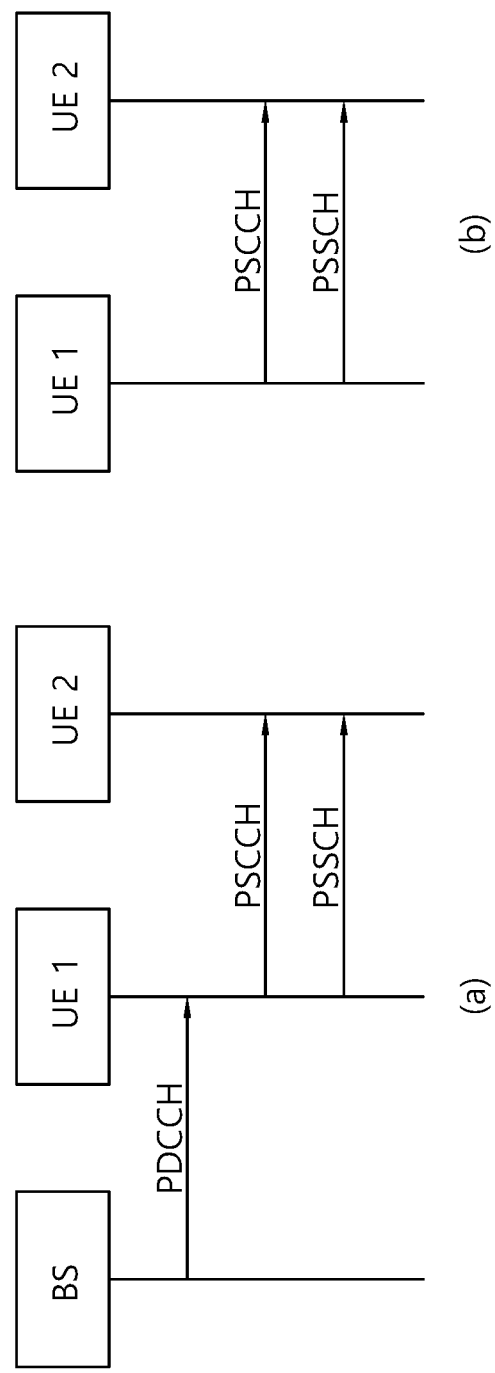
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
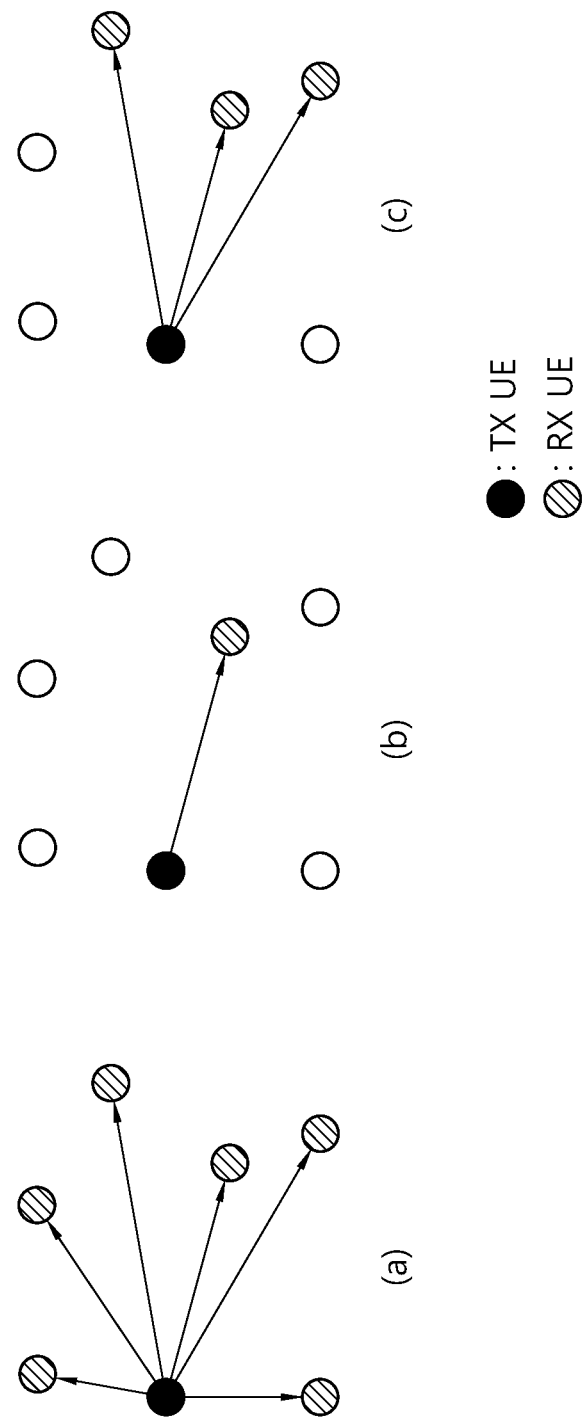
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in various embodiments of the present disclosure, for example, a transmitting UE (TX UE) may be a UE transmitting data to a (target) receiving UE (RX UE). For example, a TX UE may be a UE performing PSCCH and/or PSSCH transmission. And/or, for example, a TX UE may be a UE that transmits an SL CSI-RS and/or SL CSI report request indicator to a (target) RX UE. And/or, for example, the TX UE may be a UE which transmits a (pre-defined) reference signal(s) (e.g., PSSCH demodulation reference signal (DM-RS)) and/or SL (L1) RSRP report request indicator, which is/are used for SL (L1) RSRP measurement, to (target) to RX UE(s). And/or, for example, a TX UE may be a UE that transmits a reference signal (e.g., DM-RS, CSI-RS) on a channel and/or the (control) channel (e.g., PSCCH, PSSCH) to be used for the SL RLM and/or SL RLF operation of a (target) RX UE.

Meanwhile, in various embodiments of the present disclosure, for example, a receiving UE (RX UE) may be a UE transmitting SL HARQ feedback to a transmitting UE (TX UE) according to whether decoding of data received from the TX UE succeeds and/or whether the detection/decoding success of a PSCCH (related to a PSSCH scheduling) transmitted by the TX UE. And/or, for example, a RX UE may be a UE that performs SL CSI transmission to a TX UE based on the SL CSI-RS and/or the SL CSI report request indicator received from the TX UE. And/or, for example, a RX UE is a UE that transmits to a TX UE a SL (L1) RSRP measurement value measured based on a (pre-defined) reference signal and/or the SL (L1) RSRP report request indicator received from the TX UE. And/or, for example, a RX UE may be a UE that transmits its own data to a TX UE. And/or, for example, a RX UE may be a UE that performs SL RLM and/or SL RLF operations based on a reference signal on a (control) channel and/or a (pre-configured) (control) channel received from a TX UE.

Meanwhile, in various embodiments of the present disclosure, for example, when the RX UE transmits SL HARQ feedback information for the PSSCH and/or PSCCH received from the TX UE, the following scheme or some of the following schemes may be considered. Herein, for example, the following scheme or some of the following schemes may be limitedly applied only when the RX UE successfully decodes/detects the PSCCH scheduling the PSSCH.

(1) Groupcast HARQ feedback option 1: NACK information may be transmitted to the TX UE only when the RX UE fails to decode/receive the PSSCH received from the TX UE.

(2) Groupcast HARQ feedback option 2: When the RX UE succeeds in decoding/receiving the PSSCH received from the TX UE, ACK information may be transmitted to the TX UE, and when PSSCH decoding/reception fails, NACK information may be transmitted to the TX UE.

Meanwhile, in various embodiments of the present disclosure, for example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on a PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information, information on the number of antenna ports Meanwhile, in various embodiments of the present disclosure, for example, since the TX UE may transmit the SCI, the first SCI and/or the second SCI to the RX UE through the PSCCH, the PSCCH may be replaced/substituted with at least one of SCI, first SCI, and/or second SCI. And/or, for example, the SCI may be replaced/replaced by the PSCCH, the first SCI and/or the second SCI. And/or, for example, since the TX UE may transmit the second SCI to the RX UE through the PSSCH, the PSSCH may be replaced/substituted with the second SCI.

Meanwhile, in various embodiments of the present disclosure, for example, when SCI configuration fields are divided into two groups in consideration of the (relatively) high SCI payload size, the first SCI including the first SCI configuration field group may be referred to as 1st SCI, and the second SCI including the second SCI configuration field group may be referred to as 2nd SCI. In addition, for example, the 1st SCI may be transmitted to the receiving UE through the PSCCH. In addition, for example, the 2nd SCI may be transmitted to the receiving UE through (independent) PSCCH, or may be piggybacked with data through PSSCH and transmitted.

Meanwhile, in various embodiments of the present disclosure, "configuration" or "define" may mean (resource pool specific) (pre-) configuration from a base station or network (via pre-defined signaling (e.g., SIB, MAC, RRC, etc.)).

Meanwhile, in this specification, for example, since RLF may be determined based on an OUT-OF-SYNCH (OOS) indicator or an IN-SYNCH (IS) indicator, RLF may be replaced/replaced by an OUT-OF-SYNCH (OOS) or an IN-SYNCH (IS).

Meanwhile, in various embodiments of the present disclosure, a resource block (RB) may be replaced/substituted with a sub-carrier. In addition, for example, in the present disclosure, a packet or traffic may be substituted/replaced with a transport block (TB) or MAC PDU according to a transmitted layer.

Meanwhile, in various embodiments of the present disclosure, for example, a CBG may be replaced/substituted with a TB.

Meanwhile, in various embodiments of the present disclosure, for example, a source ID may be replaced/substituted with a destination ID.

Meanwhile, in various embodiments of the present disclosure, for example, a L1 ID may be replaced/substituted by a L2 ID. For example, a L1 ID may be a L1 source ID or a L1 destination ID. For example, a L2 ID may be a L2 source ID or a L2 destination ID.

Meanwhile, in the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in various embodiments of the present disclosure, a channel may be replaced/substituted with a signal. For example, transmission/reception of a channel may include transmission/reception of a signal. For example, transmission/reception of a signal may include transmission/reception of a channel.

Meanwhile, in various embodiments of the present disclosure, for example, a cast type may be interchanged/substituted with a unicast, a groupcast, and/or a broadcast. For example, a cast type may be interchanged/substituted with at least one of unicast, groupcast, and/or broadcast. For example, the cast or cast type may include unicast, groupcast and/or broadcast.

Meanwhile, in various embodiments of the present disclosure, for example, resources may be interchanged/replaced with slots or symbols.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), a QoS profile, a QoS parameter, and/or requirement, or vice versa.

Meanwhile, in various embodiments of the present disclosure, for convenience of explanation, for example, a (physical) channel used when the RX UE transmits at least one of the following information to the TX UE may be referred to as a PSFCH.

SL HARQ feedback, SL CSI, SL (L1) RSRP

Meanwhile, in various embodiments of the present disclosure, a Uu channel may include a UL channel and/or a DL channel. For example, a UL channel may include PUSCH, PUCCH, and the like. For example, the DL channel may include PDCCH, PDSCH, and the like. For example, an SL channel may include PSCCH, PSSCH, PSFCH, PSBCH, and the like.

Meanwhile, in various embodiments of the present disclosure, a sidelink information may include at least one of a sidelink message, a sidelink packet, a sidelink services, a sidelink data, sidelink control information, and/or a sidelink transport block (TB). For example, sidelink information may be transmitted through PSSCH and/or PSCCH.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

For example, in order to support a service of tight requirements, a resource reservation method of various numbers/patterns may need to be defined through a limited SCI payload.

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 12 shows a method in which a UE that has reserved transmission resource(s) informs another UE of the transmission resource(s), based on an embodiment of the present disclosure. The embodiment of FIG. 12 may be combined with various embodiments of the present disclosure.

Specifically, for example, (a) of FIG. 12 shows a method for performing by a transmitting UE chain-based resource reservation by transmitting/signaling location information of (maximum) 2 transmission resources to receiving UE(s) through one SCI, in the case of a value of K=4. For example, (b) of FIG. 12 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 12, the transmitting UE may transmit/signal only location information of the fourth transmission-related resource to the receiving UE(s) through the fourth (or last) transmission-related PSCCH. For example, referring to (a) of FIG. 12, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 12, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 12, if the transmitting UE may transmit/signal to the receiving UE(s) only location information of the fourth transmission-related resource through the fourth (or last) transmission-related PSCCH, the transmitting UE may configure or designate a field/bit of location information of unused or remaining transmission resource(s) to a pre-configured value (e.g., 0). For example, in (a) and (b) of FIG. 12, if the transmitting UE may transmit/signal to the receiving UE(s) only location information of the fourth transmission-related resource through the fourth (or last) transmission-related PSCCH, the transmitting UE may be configured or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 12 shows a method for performing by the transmitting UE block-based resource reservation, by signaling location information of 4 transmission resources to receiving UE(s) through one SCI, in the case of a value of K=4.

On the other hand, for example, in order to reduce the probability that some or all of resources for an initial transmission of a transmitting UE and resources for an initial transmission and/or retransmission of the other transmitting UE collide/overlap, according to the method described in Table 5, a UE may perform resource reservation. Here, for example, for convenience of description. The alternatives described below (e.g., Alt. 1-1 or Alt. 1-2) may be referred to as "pre-reservation signal or pre-reservation operation". For example, when the size of a subchannel and/or the TB size related to an SL transmission of a UE is smaller than a pre-configured threshold, resource waste according to the pre-reservation operation of a UE may be large. In particular, in case of Alt. 1-2, if the size of a subchannel and/or the TB size related to an SL transmission of a UE is smaller than a pre-configured threshold, resource waste according to the pre-reservation operation of the UE may be large. Therefore, in this case, a pre-reservation operation of a UE may be configured not to be allowed. For example, when the congestion level is higher than a pre-configured threshold, a pre-reservation operation of a UE may be configured not to be allowed. For example, if the congestion level is lower than a pre-configured threshold, a pre-reservation operation of a UE may be configured not to be allowed. For example, if a QoS parameter is tight, for example, for a low-latency related service or a high reliability related service, a pre-reservation operation of a UE may be configured not to be allowed. For example, if a QoS parameter is loose, for example, in the case of a high latency related service or a low reliability related service, a pre-reservation operation of a UE may be configured not to be allowed. For example, if Alt. 1-2 below (and/or Alt. 1-1) is applied, a pre-reservation signal transmitted by a UE may be configured not to be reflected (or reflected) in the counting (and/or (pre-configured) (specific TB-related) counting related to the maximum (allowed) number of retransmissions) related to the maximum CR limit (unlike a general PSSCH (and/or PSCCH) (or Alt. 1-1)) (pre-configured) under congestion control. As another example, when a UE transmits a pre-reservation signal on one slot, and the UE reserves a large resource on two slots thereafter, the UE may transmit/signal "$N_{MAX}=3$" through SCI. Here, for example, a UE may transmit/signal that a first transmission is transmission using a single subchannel (and/or no TB) through SCI. For example, a UE may transmit/signal "$N_{MAX}=2$" through SCI. Here, for example, a UE may transmit information on a gap between a resource for single subchannel transmission and a resource for subsequent transmission through separate signaling (e.g., SCI field).

TABLE 5

Support at least an initial transmission and reservation of the resource(s) for retransmission(s) to have the same number of sub-channels To down-select in the early week of RAN1#99 one of the following:

Alt. 1-1: Support a single sub-channel PSCCH+PSSCH reserving resource(s) for retransmission(s) of a TB with a larger number of sub-channels, where PSSCH REs are occupied by 2nd stage SCI and by SCH 1 bit indication is carried in 1st stage SCI to distinguish the single sub-channel TBS is determined based on number of sub-channels indicated for reserved resource(s)

RV is determined based on explicit field in 2nd stage SCI (as agreed)

TABLE 5-continued

Alt. 1-2: Support a single sub-channel PSCCH+PSSCH reserving resource(s) for the initial
transmission and possibly retransmission(s) of a TB with a larger number of sub-channels,
where all available PSSCH REs in the single sub-channel PSCCH+PSSCH are occupied only
by 2nd stage SCI
1st stage SCI indicates that PSSCH REs are occupied by 2nd stage SCI
Alt. 2: Do not support the different number of sub-channels between initial transmission and
reservation of resource(s) for retransmission(s)
Alt 1 is not supported in this case
Companies are encouraged to provide more analysis and evaluations for the above 3
alternatives Referring to Table 5, a resource for a UE to perform initial transmission and a resource reserved for retransmission by a UE may have the same number of subchannels. For example, according to Alt. 1-1, a UE may reserve a resource for retransmission of a TB through a larger number of subchannels by using a single subchannel reservation resource (e.g., PSCCH and PSSCH). Here, for example, PSSCH RE may be occupied by $2^{nd}$ SCI and SCH. For example, according to Alt. 1-2, a UE may use a single subchannel reservation resource (e.g., PSCCH and PSSCH) to reserve a resource for initial transmission and the possibility of retransmission of a TB through a larger number of subchannels. Here, for example, all available PSSCH REs in a single subchannel may be occupied by only the $2^{nd}$ SCI. For example, according to Alt 2, a UE may need to reserve a resource for retransmission equal to the number of sub-channels of a resource for performing initial transmission.

On the other hand, for example, before a transmission UE reserves/selects a resource, and the transmission UE transmits SL information using the reserved/selected resource, the transmitting UE may perform an operation according to the method described in Table 6, in order for the transmitting UE to check/determine whether a resource reserved/selected by itself collides with/overlapping some or all of a resource reserved/selected by another UE.

a resource selection window and the selection of resources for (re)transmission among the identified candidate resources. For example, in a resource (re)selection procedure, it is assumed that a transmitting UE identifies a candidate resource in a resource selection window, and selects a first resource for (re)transmission from among the identified candidate resources. In this case, before the transmitting UE transmits SCI using a first resource, the transmitting UE may re-evaluate the resource (re)selection procedure. For example, a re-evaluation of a (re)selection procedure for resource reservation signaled at the moment of 'm' may not be required to be triggered at a later moment than the moment of 'm-T3'. That is, for example, resource reselection processing time may need to be secured.

For example, for a given time instance n at which a resource (re) selection and re-evaluation procedure is triggered, a resource selection window may start at time instance (n+T1) and end at time instance (n+T2). Here, for example, it may be T1≥0. For example, the starting point T1 of a selection window may depend on an implementation of a UE. At this time, for example, it may be $T1 \leq T_{proc,0}$. For example, a UE's selection of T2 may have to satisfy a delay requirement. For example, in relation to a delay requirement, it may be T2≤remaining Packet Delay Budget (PDB). For example, for a given time instance n at which a resource

TABLE 6

Resource (re-)selection procedure supports re-evalvation of Step 1 and Step 2 before
transmission of SCI with reservation
The re-evaluation of the (re-)selection procedure for a resource reservation signalled in a
moment 'm' is not required to be triggered at moment > 'm − T3' (i.e. resource reselection
processing time needs to be ensured)
FFS condition to change resource(s) from previous iteration to resource(s) from current
iteration
FFS relationship of T1 and T3, if any
FFS whether to handle it differently for blind and feedback-based retransmission resources
For a given time instance n when resource (re-)selection and re-evaluation procedure is
triggered
The resource selection window starts at time instance (n + T1), T1 ≥ 0 and ends at time
instance (n + T2)
The start of selection window T1 is up to UE implementation subject to T1 ≤ $T_{proc,1}$
T2 is up to UE implementation with the following details as a working assumption:
T2 ≥ $T2_{min}$
If T2min > Remaining PDB, then T2min is modified to be equal to Remaining PDB
FFS other details of T2min including whether the minimum window duration T2min −
T1 is a function of priority
UE selection of T2 shall fulfil the latency requirement, i.e. T2 ≤ Remaining PDB
A sensing window is defined by time interval (n − T0, n − $T_{proc,0}$)
T0 is (pre-)configured, T0 > $T_{proc,0}$ FFS further details
FFS, if $T_{proc,0}$ and $T_{proc,1}$ are defined separately or as a sum
FFS relation of T3, Tproc,0, Tproc,1
Time instances n, T0, T1, T2, T2min are measured in slots, FFS Tproc,0 and Tproc,1
A UE is expected to select resources for all intended (re-)transmissions within the PDB. i.e. the
number of intended (re-)transmissions is an input to the resource (re-)selection procedure Referring to Table 6, before a transmitting UE transmits SCI using a reserved/selected resource, the transmitting UE may re-evaluate the identification of candidate resources in (re)selection and reevaluation procedure is triggered, a sensing window may be defined as a time interval [n−T0, n−$T_{proc,0}$]. For example, T0 may be configured for a UE or may be pre-configured. For example, a UE may receive information related to T0 from a network/base station. For example, it may be T0>$T_{proc,0}$.

For example, a UE may select a resource for all intended (re)transmission within a Packet Delay Budget (PDB). For example, a UE may perform resource reselection based on the number of intended (re)transmissions.

For example, a transmission UE may be configured to select/reserve resources for transmission of the same or different TBs according to some or all of the rules below. For example, a transmitting UE may select/reserve resources for transmission of the same or different TBs according to some or all of the rules below. For example, in some or all of the rules below, a window (W) value may be (remaining) PDB. And/or, for example, a W value may be a (maximum) time interval that a UE can buffer (for HARQ combining operation).

TABLE 7

When reservation of a sidelink resource for an initial transmission of a TB at least by an SCI associated with a different TB is disabled, $N_{MAX}$ is 3
SCI signaling is designed to allow to indicate 1 or 2 or 3 resources at least of the same number of sub-channels with full flexibility in time and frequency position in a window W of a resource pool
FFS: if full flexibility is limited in some cases
Value 2 or 3 is (pre-)configured per resource pool
FFS size of window W
When reservation of a sidelink resource for an initial transmission of a TB at least by an SCI associated with a different TB is enabled, select in RAN1#99 from the following:
Option 1-a. A period > W is additionally signaled in SCI and the same reservation is applied with respect to resources indicated within $N_{MAX}$ within window W at subsequent periods
FFS number of subsequent reservation periods
FFS $N_{MAX}$ is always same regardless if a period > W is additionally signaled or not for SCI size perspective.
Option 1-b. A time gap > W is additionally signaled in SCI and the same reservation is applied with respect to resources indicated within $N_{MAX}$ within window W at resources indicated by the time gap
FFS $N_{MAX}$ is always same regardless if a time gap > W is additionally signaled or not for SCI size perspective.
Option 2. There is no additional field (NDI and HARQ ID are used at the moment of SCI reception) to distinguish reservation for another TB, and at least one of NMAX resources can be signaled beyond window W Referring to Table 7, when reservation of an SL resource for initial transmission of a TB by SCI related to another TB is deactivated, $N_{MAX}$ may be 3. For example, when it is deactivated that a transmitting UE performs resource reservation for initial transmission of a second SL using SCI related to first SL information, the transmitting UE may transmit information on up to three resources by using one SCI. For example, the SCI may be designed to indicate 1, 2, or 3 resources. For example, the number of the resources may be equal to the number of subchannels having maximum flexibility related to the position of time and frequency within a window W of a resource pool. For example, for when the SCI indicates 2 or 3, may be (pre)configured for each resource pool.

For example, when reservation of an SL resource for initial transmission of a TB by SCI related to another TB is activated, various options may exist. For example, when a transmission UE is activated to perform resource reservation for the initial transmission of second SL using SCI related to first SL information, various options may exist.

For example, according to option 1-a, a transmitting UE may transmit/signal 'PERIOD>W' through SCI. For example, according to option 1-b, a transmitting UE may transmit/signal 'TIME GAP>W' through SCI. For example, according to option 2, an additional field for distinguishing reservations for other TBs (NDI and HARQ ID are used at the time of SCI reception) may not exist on SCI.

Figure 13:
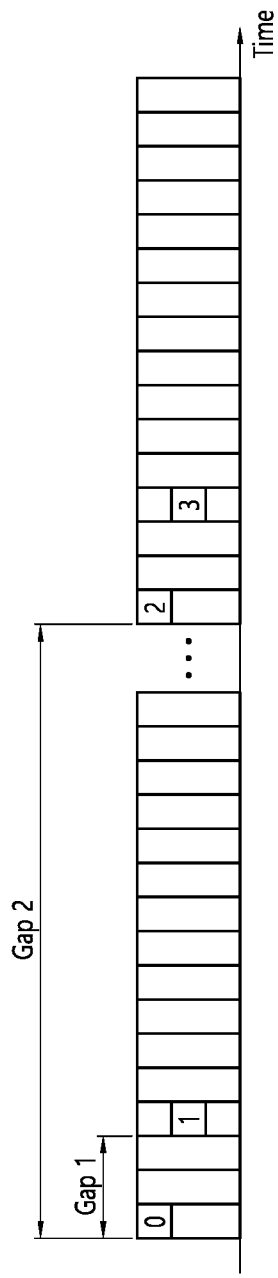
FIG. 13 shows GAP 1 and GAP 2 transmitted through SCI according to an embodiment of the present disclosure.

On the other hand, for example, in the case of LTE V2X, a UE reserves a transmission resource as in the embodiment of FIG. 13. Here, for example, it is assumed that the maximum number of resource information that a UE can signal/transmit on one SCI is 4.

FIG. 13 shows GAP 1 and GAP 2 transmitted through SCI according to an embodiment of the present disclosure. The embodiment of FIG. 13 may be combined with various embodiments of the present disclosure.

Referring to FIG. 13, a UE may transmit/signal information on GAP 1 and information on GAP 2 through one SCI. Accordingly, a UE may reserve/select four transmission resources. In the embodiment of FIG. 13, one cell may mean one subframe unit or one slot unit.

Figure 14:
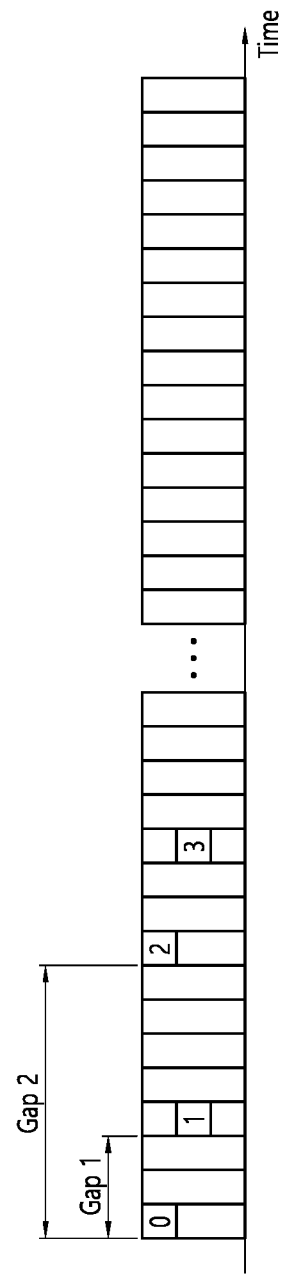
FIG. 14 shows GAP 1 and GAP 2 transmitted through SCI, according to an embodiment of the present disclosure.

FIG. 14 shows GAP 1 and GAP 2 transmitted through SCI, according to an embodiment of the present disclosure. The embodiment of FIG. 14 may be combined with various embodiments of the present disclosure.

For example, referring to FIG. 14, information on GAP 2 (e.g., GAP 2 value) transmitted/signaled by a UE through SCI may be limited to a relatively small value. For example, a UE may transmit/signal information on GAP 1 and information on GAP 2 through SCI. Here, for example, information on GAP 2 (e.g., GAP 2 value) may be a value smaller than a pre-configured value or a pre-configured small value. Accordingly, according to the embodiment of FIG. 14, a UE may reserve/select a total of four transmission resources within a relatively short time period. In the embodiment of FIG. 14, one cell may mean one subframe unit or one slot unit.

Figure 15:
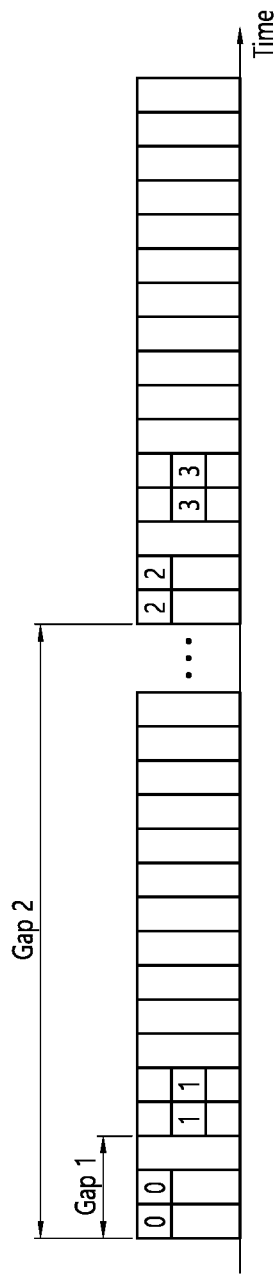
FIG. 15 shows GAP 1 and GAP 2 transmitted through SCI, according to an embodiment of the present disclosure.

FIG. 15 shows GAP 1 and GAP 2 transmitted through SCI, according to an embodiment of the present disclosure. The embodiment of FIG. 15 may be combined with various embodiments of the present disclosure.

Referring to FIG. 15, when a UE reserves/selects one transmission resource in a specific slot, the UE may repeatedly reserve/select one or more resources. For example, when a UE reserves/selects one transmission resource in a specific slot, the UE may repeatedly reserve/select one or more resources on a time resource that is continuous/adjacent to the specific slot. According to the proposed method, unlike a slot aggregation scheme, a UE may transmit a SCCH on each of reserved/selected resources. Here, for example, in order to grant (slight) scheduling freedom to a UE, a UE may transmit/signal information (e.g., the number of slots or the number of subframes) on the GAP between repeated resources by using an additional bit on SCI. In the embodiment of FIG. 15, one cell may mean one subframe unit or one slot unit.

Figure 16:
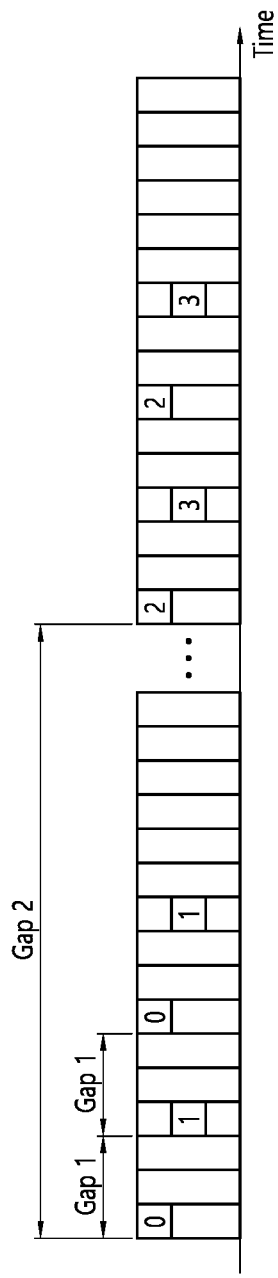
FIG. 16 shows GAP 1 and GAP 2 transmitted through SCI, according to an embodiment of the present disclosure.

FIG. 16 shows GAP 1 and GAP 2 transmitted through SCI, according to an embodiment of the present disclosure. The embodiment of FIG. 16 may be combined with various embodiments of the present disclosure.

Referring to FIG. 16, a UE can reserve/select a resource on two slots (e.g., the first slot (i.e., 0) and the fourth slot (i.e., 1)), the UE may reserve resources by repeating the reserved/selected resource at GAP 1 intervals. Here, for example, in order to give a UE a degree of scheduling freedom, a UE may transmit/signal the +DELTA or −DELTA value for the second GAP 1 through SCI.

According to an embodiment of the present disclosure, (according to the (some) rules above), when an operation of a UE to reserve/select a (specific) TB-related (initial/re) transmission resource through a different TB-related SCI is deactivated, the UE may not reserve/select a resource exceeding the (remaining) PDB boundary of a TB related to the current resource (re)selection (hereinafter, a first condition) and/or a resource exceeding the maximum (re)transmission number (hereinafter, a second condition). Or, for example, a UE may reserve/select a resource that satisfies a first condition (and/or a second condition), and the UE may perform transmission of another TB using the resource. Alternatively, ae UE may not be permitted to transmit another TB using the resource.

For example, depending on whether a UE performs a chain-based resource reservation operation, the UE may determine whether to apply at least one of the rules proposed according to various embodiments of the present disclosure. For example, a parameter may include at least one of NUM_RSC, RSRP_THD, NUM_THUP, and/or MAX_THD. And/or, for example, depending on whether a UE performs a block-based resource reservation operation, the UE may determine whether to apply at least one of the rules proposed according to various embodiments of the present disclosure. And/or, for example, according to whether a UE performs a blind retransmission operation, the UE may determine whether to apply at least one rule among rules proposed according to various embodiments of the present disclosure. And/or, for example, depending on whether a UE performs an SL HARQ feedback-based retransmission operation, the UE may determine whether to apply at least one rule among rules proposed according to various embodiments of the present disclosure. And/or, for example, depending on whether a UE performs a resource selection/reservation operation based on a configured grant, the UE may determine whether to apply at least one of the rules proposed according to various embodiments of the present disclosure. And/or, for example, depending on whether a UE performs a resource selection/reservation operation based on a dynamic grant, the UE may determine whether to apply at least one of the rules proposed according to various embodiments of the present disclosure.

And/or, for example, whether a UE applies at least one rule from among the rules proposed according to various embodiments of the present disclosure may be differently or limitedly configured for the UE for each resource pool. And/or, for example, whether a UE applies at least one rule among the rules proposed according to various embodiments of the present disclosure may be differently or limitedly configured for the UE for each service type. And/or, for example, whether a UE applies at least one rule from among the rules proposed according to various embodiments of the present disclosure may be differently or limitedly configured for the UE for each service priority. And/or, for example, whether a UE applies at least one rule from among the rules proposed according to various embodiments of the present disclosure may be configured differently or limitedly for the UE for each cast type. For example, a cast type may include at least one of unicast, groupcast, and/or broadcast. And/or, for example, whether a UE applies at least one rule among the rules proposed according to various embodiments of the present disclosure may be differently or limitedly configured for the UE for each destination UE. And/or, for example, whether a UE applies at least one rule among the rules proposed according to various embodiments of the present disclosure may be configured differently or limitedly for the UE for each (L1 or L2) destination ID. And/or, for example, whether a UE applies at least one rule among the rules proposed according to various embodiments of the present disclosure may be configured differently or limitedly for the UE for each (L1 or L2) source ID. And/or, for example, whether a UE applies at least one rule from among the rules proposed according to various embodiments of the present disclosure may be configured differently or limitedly for the UE for each (service) QoS parameter. For example, a (service) QoS parameter may include at least one of a reliability-related parameter, a delay-related parameter, and/or a (target) BLER-related parameter. And/or, for example, whether a UE applies at least one rule from among the rules proposed according to various embodiments of the present disclosure may be differently or limitedly configured for each UE for each (resource pool) congestion level. And/or, for example, whether a UE applies at least one rule from among the rules proposed according to various embodiments of the present disclosure may be configured differently or limitedly for the UE for each SL mode type. For example, an SL mode type may include SL mode 1 and/or SL mode 2. And/or, for example, whether a UE applies at least one rule from among the rules proposed according to various embodiments of the present disclosure may be configured differently or limitedly for the UE for each grant type. For example, a grant type may include a configured grant and/or a dynamic grant. And/or, for example, whether a UE applies at least one rule from among the rules proposed according to various embodiments of the present disclosure may be differently or limitedly configured for the UE for each packet/message (e.g., TB) size. And/or, for example, whether a UE applies at least one rule among the rules proposed according to various embodiments of the present disclosure may be configured differently or limitedly for the UE according to the number of subchannels used by the UE to transmit a PSSCH. And/or, for example, whether a UE applies at least one of the rules proposed according to various embodiments of the present disclosure may be configured differently or limitedly for the UE according to the number of RBs used by the UE to transmit a PSCCH. And/or, for example, whether a UE applies at least one rule among the rules proposed according to various embodiments of the present disclosure may be configured differently or limitedly for the UE according to the number of RBs constituting a (one) subchannel. And/or, for example, whether a UE applies at least one rule among the rules proposed according to various embodiments of the present disclosure may be configured differently or limitedly for the UE according to the number of subchannels constituting a resource pool and/or the number of RBs constituting a resource pool. And/or, for example, whether a UE applies at least one rule among the rules proposed according to various embodiments of the present disclosure may be configured differently or limitedly for the UE according to whether a (one) sub-channel size and a PSCCH (frequency) resource size are the same. And/or, for example, whether a UE applies at least one rule among the rules proposed according to various embodiments of the present disclosure may be configured differently or limitedly depending on whether a (semi) static codebook is configured for a UE.

For example, depending on whether a UE performs a chain-based resource reservation operation, parameters may be configured differently or limitedly for the UE. And/or, for example, depending on whether a UE performs a block-based resource reservation operation, parameters may be configured differently or limitedly for the UE. And/or, for example, according to whether a UE performs a blind retransmission operation, parameters may be configured differently or limitedly for the UE. And/or, for example, depending on whether a UE performs an SL HARQ feedback-based retransmission operation, parameters may be configured differently or limitedly for the UE. And/or, for example, depending on whether a UE performs a resource selection/reservation operation based on a configured grant, parameters may be configured differently or limitedly for the UE. And/or, for example, depending on whether a UE performs a resource selection/reservation operation based on a dynamic grant, parameters may be configured differently or limitedly for the UE.

And/or, for example, a parameter may be configured differently or limitedly for a UE for each resource pool. And/or, for example, a parameter may be configured differently or limitedly for a UE for each service type. And/or, for example, a parameter may be configured differently or limitedly for a UE for each service priority. And/or, for example, a parameter may be configured differently or limitedly for a UE for each cast type. For example, a cast type may include at least one of unicast, groupcast, and/or broadcast. And/or, for example, a parameter may be configured differently or limitedly for a UE for each destination UE. And/or, for example, a parameter may be configured differently or limitedly for a UE for each (L1 or L2) destination ID. And/or, for example, a parameter may be configured differently or limitedly for a UE for each (L1 or L2) source ID. And/or, for example, a parameter may be configured differently or limitedly for a UE for each (service) QoS parameter. For example, a (service) QoS parameter may include at least one of a reliability-related parameter, a delay-related parameter, and/or a (target) BLER-related parameter. And/or, for example, a parameter may be configured differently or limitedly for a UE for each (resource pool) congestion level. And/or, for example, a parameter may be configured differently or limitedly for a UE for each SL mode type. For example, an SL mode type may include SL mode 1 and/or SL mode 2. And/or, for example, a parameter may be configured differently or limitedly for a UE for each grant type. For example, a grant type may include a configured grant and/or a dynamic grant. And/or, for example, a parameter may be configured differently or limitedly for a UE for each packet/message (e.g., TB) size. And/or, for example, a parameter may be configured differently or limitedly for a UE for each number of subchannels used by the UE to transmit a PSSCH. And/or, for example, a parameter may be configured differently or limitedly for a UE for each number of RBs used by the UE to transmit a PSCCH. And/or, for example, a parameter may be configured differently or limitedly for a UE for each number of RBs constituting a (one) subchannel. And/or, for example, a parameter may be configured differently or limitedly for a UE for each number of subchannels constituting a resource pool and/or the number of RBs constituting a resource pool. And/or, for example, a parameter may be configured differently or limitedly for a UE according to whether a (one) sub-channel size and a PSCCH (frequency) resource size are the same. And/or, for example, a parameter may be configured differently or limitedly depending on whether a (semi) static codebook is configured for a UE.

Figure 17:
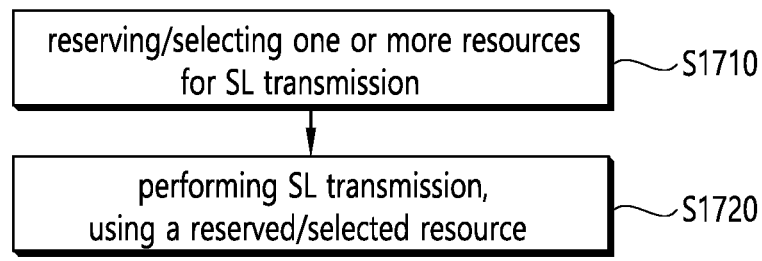
FIG. 17 shows a method for a first apparatus 100 to perform SL transmission, according to an embodiment of the present disclosure.

FIG. 17 shows a method for a first apparatus 100 to perform SL transmission, according to an embodiment of the present disclosure. The embodiment of FIG. 17 may be combined with various embodiments of the present disclosure.

Referring to FIG. 17, in step S1710, a first apparatus 100 may reserve/select one or more resources for SL transmission. For example, a resource for SL transmission may be reserved/selected based on a first GAP and/or a second GAP. For example, ae first apparatus 100 may transmit information on a first GAP and/or information on a second GAP to a second apparatus 200. For example, a first apparatus 100 may transmit information on a first GAP and/or information on a second GAP to a second apparatus 200 through SCI. For example, a first apparatus 100 may reserve/select one or more resources for SL transmission according to various embodiments of the present disclosure.

In step S1720, a first apparatus 100 may perform SL transmission using a reserved/selected resource.

The above-described embodiment may be applied to various apparatuses to be described below. For example, a processor 102 of a first apparatus 100 may reserve/select one or more resources for SL transmission. In addition, a processor 102 of a first apparatus 100 may control a transceiver 106 to perform SL transmission using a reserved/selected resource.

According to the above-described embodiment of the present disclosure, services of various requirements may be efficiently supported without excessive increase of the SCI payload.

Figure 18:
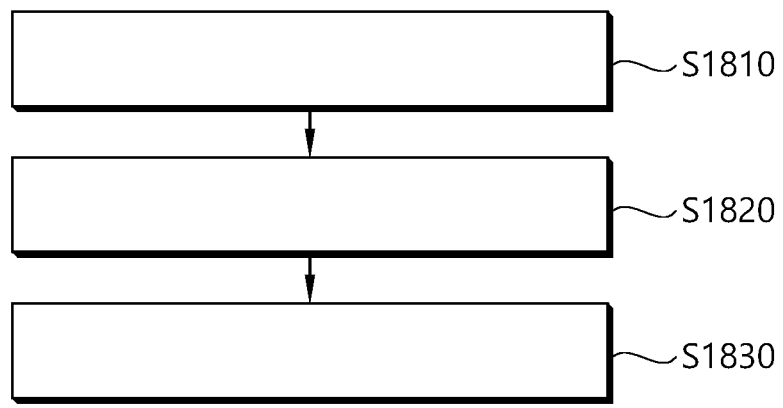
FIG. 18 shows a procedure in which a first apparatus performs resource reservation, according to an embodiment of the present disclosure.

FIG. 18 shows a procedure in which a first apparatus performs resource reservation, according to an embodiment of the present disclosure. The embodiment of FIG. 18 may be combined with various embodiments of the present disclosure.

Referring to FIG. 18, in step S1810, a first apparatus may select a first resource, a second resource, a third resource, and a fourth resource. In step S1820, the first apparatus may transmit sidelink control information (SCI) to a second apparatus through a physical sidelink control channel (PSCCH), based on at least one of the first resource, the second resource, the third resource, or the fourth resource. In step S1830, the first apparatus may transmit a physical sidelink shared channel (PSSCH) to the second apparatus, based on at least one of the first resource, the second resource, the third resource, or the fourth resource. For example, the SCI may include information related to a first time gap and a second time gap, the first resource, the second resource, the third resource, and the fourth resource may be selected based on the first time gap and the second time gap, and the first time gap may be smaller than the second time gap.

For example, the first resource may precede the second resource by the first time gap, the third resource may precede the fourth resource by the first time gap, and the third resource may precede the first resource by the second time gap.

For example, the first resource may include 2 or more slots related to the first resource, the second resource may include 2 or more slots related to the second resource, the third resource may include 2 or more slots related to the third resource, the fourth resource may include 2 or more slots related to the fourth resource, a 1st slot among the 2 or more slots related to the first resource may precede a 1st slot among the 2 or more slots related to the second resource by the first time gap, a 1st slot among the 2 or more slots related to the third resource may precede a 1st slot among the 2 or more slots related to the fourth resource by the first time gap, and the 1st slot among the 2 or more slots related to the first resource may precede the 1st slot among the 2 or more slots related to the third resource by the second time gap.

For example, the 2 or more slots related to the first resource may be reserved adjacent to each other, the 2 or more slots related to the second resource may be reserved adjacent to each other, the 2 or more slots related to the third resource may be reserved adjacent to each other, and the 2 or more slots related to the fourth resource may be reserved adjacent to each other.

For example, a time gap between a last slot among the 2 or more slots related to the first resource and a last slot among the 2 or more slots related to the second resource may be signaled together while performing the resource reservation.

For example, a different PSCCH may be transmitted through each slot included in the 2 or more slots related to the first resource, a different PSCCH may be transmitted through each slot included in the 2 or more slots related to the second resource, a different PSCCH may be transmitted through each slot included in the 2 or more slots related to the third resource, and a different PSCCH may be transmitted through each slot included in the 2 or more slots related to the fourth resource.

For example, the 1st slot among the 2 or more slots related to the first resource may precede 1st slot among the 2 or more slots related to the second resource by the first time gap, the 1st slot among the 2 or more slots related to the first resource may precede the 1st slot among the 2 or more slots related to the third resource by the second time gap, there may be a third time gap between each slot included in the 2 or more slots related to the first resource, all of the 2 or more slots related to the first resource may precede the 1st slot among the 2 or more slots related to the third resource, there may be the third time gap between each slot included in the 2 or more slots related to the second resource, all of the 2 or more slots related to the second resource may precede the 1st slot among the 2 or more slots related to the third resource, and the third time gap may be greater than the first time gap.

For example, 1st slot among the 2 or more slots related to the third resource may precede 1st slot among the 2 or more slots related to the first resource by the first time gap, there may be the third gap between each slot included in the 2 or more slots related to the third resource, and there may be the third gap between each slot included in the 2 or more slots related to the fourth resource.

For example, the third time gap may be twice the first time gap.

For example, the third time gap may be a sum of twice the first time gap and a delta value, and the delta value may be signaled together while performing the resource reservation.

For example, the SCI may be related to a transmission block (TB) transmitted through the sidelink communication, the first resource, the second resource, the third resource, and the fourth resource: may not exceed a packet delay budget (PDB) related to the TB; and may not exceed a maximum number of transmission.

For example, the SCI may be related to a second TB different from a first TB transmitted through the sidelink communication, and the first TB may be transmitted through at least one of the first resource, the second resource, the third resource, or the fourth resource.

For example, at least one of the first resource, the second resource, the third resource, or the fourth resource exceeds a PDB or a maximum number of transmission related to the second TB.

The above-described embodiment may be applied to various devices to be described below. For example, a processor 102 of a first apparatus 100 may select a first resource, a second resource, a third resource, and a fourth resource. In step S1820, the processor 102 of the first apparatus 100 may control a transceiver 106 to transmit sidelink control information (SCI) to a second apparatus 200 through a physical sidelink control channel (PSCCH), based on at least one of the first resource, the second resource, the third resource, or the fourth resource. In step S1830, the processor 102 of the first apparatus 100 may control the transceiver 106 to transmit a physical sidelink shared channel (PSSCH) to the second apparatus 200, based on at least one of the first resource, the second resource, the third resource, or the fourth resource.

According to an embodiment of the present disclosure, a first apparatus for performing wireless communication may be proposed. For example, the first apparatus may comprise: one or more memories storing instructions; one or more transceivers; and one or more processors connected to the one or more memories and the one or more transceivers. For example, the one or more processors may execute the instructions to: select a first resource, a second resource, a third resource, and a fourth resource; transmit sidelink control information (SCI) to a second apparatus through a physical sidelink control channel (PSCCH), based on at least one of the first resource, the second resource, the third resource, or the fourth resource; and transmit a physical sidelink shared channel (PSSCH) to the second apparatus, based on at least one of the first resource, the second resource, the third resource, or the fourth resource, wherein the SCI includes information related to a first time gap and a second time gap, wherein the first resource, the second resource, the third resource, and the fourth resource are selected based on the first time gap and the second time gap, and wherein the first time gap is smaller than the second time gap.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: select a first resource, a second resource, a third resource, and a fourth resource; transmit sidelink control information (SCI) to a second UE through a physical sidelink control channel (PSCCH), based on at least one of the first resource, the second resource, the third resource, or the fourth resource; and transmit a physical sidelink shared channel (PSSCH) to the second UE, based on at least one of the first resource, the second resource, the third resource, and or fourth resource, wherein the SCI includes information related to a first time gap and a second time gap, wherein the first resource, the second resource, the third resource, and the fourth resource are selected based on the first time gap and the second time gap, and wherein the first time gap is smaller than the second time gap.

According to an embodiment of the present disclosure, a non-transitory computer-readable storage medium storing instructions may be proposed. For example, the instructions, when executed, may cause a first apparatus to: select a first resource, a second resource, a third resource, and a fourth resource; transmit sidelink control information (SCI) to a second apparatus through a physical sidelink control channel (PSCCH), based on at least one of the first resource, the second resource, the third resource, or the fourth resource; and transmit a physical sidelink shared channel (PSSCH) to the second apparatus, based on at least one of the first resource, the second resource, the third resource, or the fourth resource, wherein the SCI includes information related to a first time gap and a second time gap, wherein the first resource, the second resource, the third resource, and the fourth resource are selected based on the first time gap and the second time gap, and wherein the first time gap is smaller than the second time gap.

Figure 19:
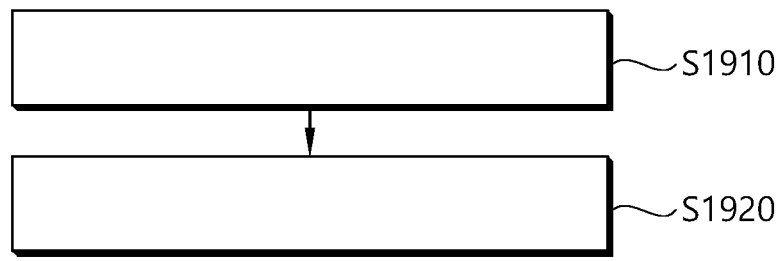
FIG. 19 shows a procedure in which a second apparatus receives an SCI, according to an embodiment of the present disclosure.

FIG. 19 shows a procedure in which a second device receives an SCI, according to an embodiment of the present disclosure. The embodiment of FIG. 19 may be combined with various embodiments of the present disclosure.

Referring to FIG. 19, in step S1910, a second apparatus may receive sidelink control information (SCI) from a first apparatus through a physical sidelink control channel (PSCCH), based on at least one of the first resource, the second resource, the third resource, or the fourth resource. In step S1920, the second apparatus may receive a physical sidelink shared channel (PSSCH) from the first apparatus, based on at least one of the first resource, the second resource, the third resource, or the fourth resource. For example, the first resource, the second resource, the third resource, and the fourth resource may be selected by the first apparatus, the SCI may include information related to a first time gap and a second time gap, the first resource, the second resource, the third resource, and the fourth resource may be selected based on the first time gap and the second time gap, and the first time gap may be smaller than the second time gap.

For example, the first resource may precede the second resource by the first time gap, the third resource may precede the fourth resource by the first time gap, and the third resource may precede the first resource by the second time gap.

The above-described embodiment may be applied to various devices to be described below. For example, a processor 202 of a second apparatus 200 may control a transceiver 206 to receive sidelink control information (SCI) from a first apparatus 100 through a physical sidelink control channel (PSCCH), based on at least one of the first resource, the second resource, the third resource, or the fourth resource. In step S1920, the processor 202 of the second apparatus 200 may control the transceiver 206 to receive a physical sidelink shared channel (PSSCH) from the first apparatus 100, based on at least one of the first resource, the second resource, the third resource, or the fourth resource.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: receive sidelink control information (SCI) from a first apparatus through a physical sidelink control channel (PSCCH), based on at least one of the first resource, the second resource, the third resource, or the fourth resource; and receive a physical sidelink shared channel (PSSCH) from the first apparatus, based on at least one of the first resource, the second resource, the third resource, or the fourth resource, wherein the first resource, the second resource, the third resource, and the fourth resource are selected by the first apparatus, wherein the SCI includes information related to a first time gap and a second time gap, wherein the first resource, the second resource, the third resource, and the fourth resource are selected based on the first time gap and the second time gap, and wherein the first time gap is smaller than the second time gap.

For example, the first resource may precede the second resource by the first time gap, the third resource may precede the fourth resource by the first time gap, and the third resource may precede the first resource by the second time gap.

On the other hand, for example, when an SL HARQ feedback operation is configured/applied to a UE performing SL communication, service-related requirements (e.g., reliability, error rate, etc.) may be efficiently satisfied. To this end, for example, a transmitting UE may transmit SL information through PSSCH and/or PSCCH, and a receiving UE may transmit SL HARQ feedback information through PSFCH. For example, a transmitting UE may transmit SL information to its target receiving UE through PSSCH and/or PSCCH. For example, a receiving UE may be a target receiving UE of a transmitting UE. For example, a receiving UE may transmit SL HARQ feedback information to a transmitting UE through PSFCH. For example, a configuration of an SL HARQ feedback information transmitted by a receiving UE through PSFCH and/or the amount of SL HARQ feedback information (e.g., the number of bits) may be determined/defined according to some or all of the following schemes.

1) A Dynamic Codebook

For example, a configuration of an SL HARQ feedback information and/or the amount of SL HARQ feedback information transmitted by a receiving UE through PSFCH may be determined/defined according to a dynamic codebook. In this case, for example, according to the number of (new) TBs transmitted by a transmitting UE, a receiving UE may change/determine the amount of SL HARQ feedback information to be transmitted. For example, according to the number of (new) TBs transmitted by a transmitting UE, a receiving UE may change/determine the amount of SL HARQ feedback information to be transmitted to a transmitting UE.

For example, when a receiving UE fails to decode a PSCCH, for example, when the receiving UE fails to decode the PSCCH transmitted by a transmitting UE, the transmitting UE should perform blind decoding on the amount of SL HARQ feedback information transmitted by the receiving UE through PSFCH and/or a PSFCH resource used by the receiving UE to transmit the SL HARQ feedback information. For example, depending on the amount of SL HARQ feedback information transmitted by a receiving UE, the receiving UE may generate/transmit SL HARQ feedback information using the number and phase values of different ZADOFF CHU sequence related Cyclic Shift (CS). For example, when SL HARQ feedback information transmitted by a receiving UE is 1 bit, the receiving UE may generate/transmit the SL HARQ feedback information using two CS values. For example, when SL HARQ feedback information transmitted by a receiving UE is 2 bits, the receiving UE may generate/transmit the SL HARQ feedback information by using 4 CS values. For example, when a transmitting UE transmits three TBs to a receiving UE, and the receiving UE fails to decode PSCCH related to one TB, the receiving UE may transmit 2-bit HARQ feedback information to the transmitting UE. In this case, a transmitting UE expecting to receive 3-bit HARQ feedback information should perform blind decoding on the HARQ feedback information.

Here, for example, in order to alleviate the problem that a transmitting UE performs blind decoding on the amount of SL HARQ feedback information transmitted by a receiving UE through PSFCH and/or a PSFCH resource used by the receiving UE to transmit the SL HARQ feedback information, the transmitting UE may transmit to the receiving UE an SCI including an indicator field indicating how many times (new) TB transmission the transmitting UE has performed to the receiving UE. For example, SCI may be a $2^{nd}$ SCI.

2) A (Semi) Static Codebook

For example, a configuration of SL HARQ feedback information and/or the amount of SL HARQ feedback information transmitted by a receiving UE through PSFCH may be determined/defined according to a (semi) static codebook.

For example, the number of slots of a PSSCH resource linked to a PSFCH resource and/or the number of slots of a PSCCH resource linked to a PSFCH resource may be configured or pre-configured for a UE. For example, the number of slots of a PSSCH resource linked to a PSFCH resource and/or the number of slots of a PSCCH resource linked to a PSFCH resource may be configured or pre-configured for a UE per resource pool.

And/or, for example, the position of a PSSCH resource linked with the PSFCH resource and/or the position of the PSCCH resource linked with the PSFCH resource may be configured for the UE or may be pre-configured. For example, the position of a PSSCH resource linked with a PSFCH resource and/or the position of a PSCCH resource linked with a PSFCH resource may be configured for a UE for each resource pool or may be pre-configured.

And/or, for example, an index of a PSSCH resource linked with a PSFCH resource and/or an index of a PSCCH resource linked with a PSFCH resource may be configured for a UE or pre-configured. For example, an index of a PSSCH resource linked with a PSFCH resource and/or an index of the PSCCH resource linked with a PSFCH resource may be configured for a UE for each resource pool or may be pre-configured.

For example, a UE may determine the amount of SL HARQ feedback information included in a PSFCH, based on at least one of the number of slots of a PSSCH resource linked with a PSFCH resource, the number of slots of a PSCCH resource linked with a PSFCH resource, the position of a PSSCH resource linked with a PSFCH resource, the position of a PSCCH resource linked with a PSFCH resource, an index of a PSSCH resource linked with a PSFCH resource and/or an index of a PSCCH resource linked with a PSFCH resource.

For example, a receiving UE may sequentially include (before a PSFCH slot) feedback information related to a PSSCH slot and/or a PSCCH slot of a relatively low index in SL HARQ feedback information (on a specific PSFCH). For example, a receiving UE may sequentially include (before a PSFCH slot) feedback information related to a PSSCH slot and/or a PSCCH slot of a relatively high index in SL HARQ feedback information (on a specific PSFCH). For example, a receiving UE may include (before a PSFCH slot) feedback information related to a PSSCH slot and/or a PSCCH slot of a pre-configured index to SL HARQ feedback information (on a specific PSFCH). And, for example, a receiving UE may transmit SL HARQ feedback information to a transmitting UE through a specific PSFCH.

Hereinafter, according to various embodiments of the present disclosure, when a UE determines a configuration of SL HARQ feedback information and/or the amount of SL HARQ feedback information based on a (semi) static codebook, a method for efficiently operating a PSFCH resource by a UE and an apparatus supporting the same are proposed.

According to an embodiment of the present disclosure, a PSFCH slot may be linked with N PSSCH slots. And/or, for example, a PSFCH slot may be related with N PSSCH slots. For example, the PSFCH slot may include a PSFCH resource. For example, N may be a positive integer.

For example, when a PSFCH slot is linked with N PSSCH slots and/or PSCCH slots, a UE may transmit M-bit HARQ feedback information through K pre-configured PSSCH slots and/or PSFCH related to PSCCH slots. For example, when a PSFCH slot is linked with N PSSCH slots and/or PSCCH slots, a UE may transmit M-bit HARQ feedback information by using pre-configured K PSSCH slots and/or PSFCH resources linked to PSCCH slots. And, for example, a UE may transmit N-bit HARQ feedback information through the remaining (N−K) PSSCH slots and/or a PSFCH related to PSCCH slots. For example, a UE may transmit N-bit HARQ feedback information by using the remaining (N−K) PSSCH slots and/or a PSFCH related to PSCCH slots. Or, for example, a UE may transmit HARQ feedback information of a pre-configured number of bits through the remaining (N−K) PSSCH slots and/or a PSFCH related to PSCCH slots. For example, a UE may transmit HARQ feedback information of a pre-configured number of bits by using the remaining (N−K) PSSCH slots and/or PSFCH resources related to PSCCH slots. For example, K may be a positive integer less than N. For example, M may be a positive integer less than N. For example, a pre-configured K PSSCH slots and/or PSCCH slots may be K PSSCH slots and/or PSCCH slots having a relatively low index. For example, a pre-configured K PSSCH slots and/or PSCCH slots may be K PSSCH slots and/or PSCCH slots having a relatively high index.

For example, it is assumed that a PSFCH slot is linked with two PSSCH slots and/or a PSCCH slot. For example, assume that N is 2. In this case, for example, a UE may transmit 1-bit SL HARQ feedback information through a first PSSCH slot and/or a PSFCH related to a first PSCCH slot. For example, a UE may transmit 1-bit SL HARQ feedback information by using a first PSSCH slot and/or a PSFCH resource related to a first PSCCH slot. For example, in order for a UE to express ACK/NACK information, the UE may use two PSFCH resources. Also, for example, a UE may transmit 2-bit SL HARQ feedback information through a second PSSCH slot and/or a PSFCH related to a second PSCCH slot. For example, a UE may transmit 2-bit SL HARQ feedback information by using a second PSSCH slot and/or a PSFCH resource related to a second PSCCH slot. For example, in order for a UE to express a combination of ACK/NACK information, the UE may use 4 PSFCH resources.

For example, it is assumed that a PSFCH slot is linked with three PSSCH slots and/or PSCCH slots. For example, assume that N is 3. In this case, for example, a UE may transmit 1-bit SL HARQ feedback information through a first PSSCH slot and/or a PSFCH related to a first PSCCH slot. For example, a UE may transmit 1-bit SL HARQ feedback information by using a first PSSCH slot and/or a PSFCH resource related to a first PSCCH slot. For example, in order for a UE to express ACK/NACK information, the UE may use two PSFCH resources. Also, for example, a UE may transmit 2-bit SL HARQ feedback information through a second PSSCH slot and/or a PSFCH related to a second PSCCH slot. For example, a UE may transmit 2-bit SL HARQ feedback information by using a second PSSCH slot and/or a PSFCH resource related to a second PSCCH slot. For example, in order for a UE to express a combination of ACK/NACK information, a UE may use 4 PSFCH resources. Also, for example, a UE may transmit 2-bit SL HARQ feedback information through a second PSSCH slot and/or a PSFCH related to a second PSCCH slot. For example, a UE may transmit 3-bit SL HARQ feedback information by using a third PSSCH slot and/or a PSFCH resource related to a third PSCCH slot. For example, in order for a UE to express a combination of ACK/NACK information, the UE may use 8 PSFCH resources.

According to various embodiments of the present disclosure, even if a UE uses a (semi) static codebook for transmission of HARQ feedback information, it is possible to effectively prevent wasting of PSFCH resources. For example, when a PSFCH slot is linked with two PSSCH slots and/or a PSCCH slot, according to the prior art, a UE must use 8 PSFCH resources to transmit SL HARQ feedback information. On the other hand, for example, when a PSFCH slot is linked with two PSSCH slots and/or PSCCH slots, according to an embodiment of the present disclosure, a UE may use 6 PSFCH resources for transmission of SL HARQ feedback information.

For convenience of description, a method has been described in which a UE determines configuration of SL HARQ feedback information and/or the amount of SL HARQ feedback information based on a (semi) static codebook. However, the proposed method of the present disclosure is not limited thereto. The above-described proposed method can be extended and applied even when a UE determines a configuration of SL HARQ feedback information and/or the amount of SL HARQ feedback information based on a dynamic codebook.

Figure 20:
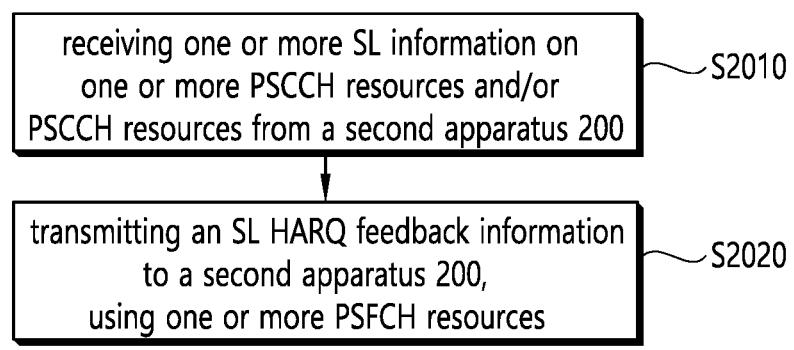
FIG. 20 shows a method for a first device 100 to transmit SL HARQ feedback information, according to an embodiment of the present disclosure.

FIG. 20 shows a method for a first device 100 to transmit SL HARQ feedback information, according to an embodiment of the present disclosure. The embodiment of FIG. 20 may be combined with various methods and/or procedures proposed according to various embodiments of the present disclosure.

Referring to FIG. 20, in step S2010, a first device 100 may receive one or more SL information from a second device 200 on one or more PSCCH resources and/or PSSCH resources. For example, a PSCCH resource may include a PSCCH slot. For example, a PSSCH resource may include a PSSCH slot. For example, one or more PSCCH resources and/or PSSCH resources may be related to one or more PSFCH resources.

In step S2020, a first device 100 may transmit SL HARQ feedback information to a second device 200 using one or more PSFCH resources. For example, the SL HARQ feedback information may be related to one or more SL information. For example, a first device 100 may determine a configuration of SL HARQ feedback information and/or an amount (e.g., number of bits) of SL HARQ feedback information according to various embodiments of the present disclosure.

The above-described embodiment may be applied to various devices to be described below. For example, a processor 102 of a first device 100 may control ae transceiver 106 to receive one or more SL information from a second device 200 on one or more PSCCH resources and/or PSSCH resources. In addition, a processor 102 of a first device 100 may control a transceiver 106 to transmit SL HARQ feedback information to a second device 200 using one or more PSFCH resources.

Meanwhile, for example, when a transmitting UE has SL information to be transmitted, the transmitting UE may perform a sensing operation and/or a resource (re)selection procedure. For example, after a transmitting UE performs a sensing operation, if a transmitting UE determines that the number of selectable candidate resources does not exist as much as NUM_RSC within the (linked) selection window, a transmitting UE may increase RSRP_THD by a pre-configured offset value until a resource of NUM_RSC or more is secured. For example, NUM_RSC may be at least one of a ratio of pre-configured resources, the number of pre-configured resources, a ratio of resources required for a transmitting UE to transmit a TB, and/or the number of resources required for a transmitting UE to transmit a TB. For example, an RSRP_THD may be a PSSCH DMRS RSRP threshold. For example, a PSSCH DMRS RSRP may be an RSRP value measured by a transmitting UE based on a DMRS on a PSSCH. For example, a pre-configured offset value may be 3 [dB].

Here, for example, when the above rule is applied, a problem may occur in which a transmitting UE transmits SL information having a (relatively) high reliability requirement by using a resource having a (relatively) high interference. Accordingly, there is a need to propose a method for solving the above-described problem and an apparatus supporting the same. Hereinafter, rule A, rule B, and rule C are divided and described for convenience of explanation, but at least one of rules A to C may be combined with each other.

1. Rule A

According to an embodiment of the present disclosure, the number of times a transmitting UE increases an RSRP_THD value based on a pre-configured offset value (hereinafter, NUM_THUP) may be configured differently for a transmitting UE according to a service priority. And/or, for example, a NUM_THUP may be configured differently for a transmitting UE according to a service type. And/or, for example, a NUM_THUP may be configured differently for a transmitting UE according to QoS requirements (e.g., reliability and/or latency). And/or, for example, a NUM_THUP may be configured differently for a transmitting UE according to the number of resources a transmitting UE uses for TB transmission. And/or, for example, a NUM_THUP may be configured differently for a transmitting UE according to whether an SL HARQ feedback-based retransmission operation is configured for a transmitting UE. And/or, for example, a NUM_THUP may be configured differently for a transmitting UE according to whether a resource used by a transmitting UE for SL communication is a resource related to initial transmission. And/or, for example, a NUM_THUP may be configured differently for a transmitting UE according to whether a resource used by a transmitting UE for SL communication is a resource related to retransmission. For example, a pre-configured offset value may be 3 [dB].

And/or, for example, the maximum value (hereinafter, MAX_THD) of RSRP_THD that can be increased by a transmitting UE may be configured differently for a transmitting UE according to a service priority. And/or, for example, a MAX_THD may be configured differently for a transmitting UE, according to a service type. And/or, for example, a MAX_THD may be configured differently for a transmitting UE, according to a QoS requirement (e.g., reliability and/or latency). And/or, for example, a MAX_THD may be configured differently for a transmitting UE, according to the number of resources used by a transmitting UE for TB transmission. And/or, for example, a MAX_THD may be configured differently for a transmitting UE, according to whether an SL HARQ feedback-based retransmission operation is configured for a transmitting UE. And/or, for example, a MAX_THD may be configured differently for a transmitting UE, according to whether a resource used by a transmitting UE for SL communication is a resource related to initial transmission. And/or, for example, a MAX_THD may be configured differently for a transmitting UE, according to whether a resource used by a transmitting UE for SL communication is a resource related to retransmission.

For example, when a transmitting UE transmits SL information of (relatively) high priority and/or high reliability requirements, a NUM_THUP value and/or a MAX_THD value may be configured to be (relatively) large for a transmitting UE. For example, when a transmitting UE transmits SL information of a higher priority and/or high reliability requirement than a pre-configured threshold, a NUM_THUP value and/or a MAX_THD value may be configured to be (relatively) large for a transmitting UE.

For example, when a transmitting UE transmits SL information of (relatively) low priority and/or low reliability requirements, a NUM_THUP value and/or a MAX_THD value may be configured to be (relatively) small for a transmitting UE. For example, when a transmitting UE transmits SL information of lower priority and/or lower reliability requirements than a pre-configured threshold, a NUM_THUP value and/or a MAX_THD value may be configured to be (relatively) small for a transmitting UE.

For example, when a transmitting UE requires a (relatively) large number of resources to transmit a TB, a NUM_THUP value and/or a MAX_THD value may be configured to be (relatively) large for a transmitting UE. For example, when a transmitting UE requires more resources than a pre-configured threshold to transmit a TB, a NUM_THUP value and/or a MAX_THD value may be configured to be (relatively) large for a transmitting UE.

For example, when a (relatively) small number of resources are required for a transmitting UE to transmit a TB, a NUM_THUP value and/or a MAX_THD value may be configured to be (relatively) small with respect to a transmitting UE. For example, when the number of resources less than a pre-configured threshold value is required for a transmitting UE to transmit a TB, a NUM_THUP value and/or a MAX_THD value may be configured to be (relatively) small with respect to a transmitting UE.

For example, when an SL HARQ feedback-based retransmission operation is configured for a transmitting UE, a NUM_THUP value and/or a MAX_THD value may be configured to be (relatively) small for a transmitting UE. For example, when an operation of blind retransmission is configured for a transmitting UE, a NUM_THUP value and/or a MAX_THD value may be configured (relatively) large for a transmitting UE.

For example, when an SL HARQ feedback-based retransmission operation is configured for a transmitting UE, a NUM_THUP value and/or a MAX_THD value may be configured to be (relatively) large for a transmitting UE. For example, when an operation of blind retransmission is configured for a transmitting UE, a NUM_THUP value and/or a MAX_THD value may be configured to be (relatively) small for a transmitting UE.

2. Rule B

For example, despite the fact that a transmitting UE increases an RSRP_THD value based on (pre-configured) NUM_THUP and/or MAX_THD, a transmitting UE may determine that the number of selectable candidate resources does not exist more than NUM_RSC within a (linked) selection window. And/or, for example, despite the fact that a transmitting UE increases an RSRP_THD value based on (pre-configured) NUM_THUP and/or MAX_THD, a transmitting UE may not be able to secure more selectable candidate resources than the number of resources required for TB transmission. In this case, a transmitting UE may perform an operation according to at least one embodiment proposed below.

For example, a transmitting UE may perform TB transmission using only selectable transmission resources on a current (sub) selection window. For example, when the number of transmission resources selectable by a transmitting UE on a current (sub) selection window is smaller than the number of transmission resources required for the transmitting UE for TB transmission, the transmitting UE may not perform some TB (re)transmission due to insufficient resources. For example, a transmitting UE may omit some TB (re)transmission due to insufficient resources.

And/or, for example, a transmitting UE may perform resource selection in a subsequent (sub) selection window. For example, a transmitting UE may perform resource selection in a subsequent (sub) selection window in which NUM_RSC or more selectable candidate resources exist. For example, a transmitting UE may perform resource selection in a subsequent (sub) selection window in which selectable candidate resources greater than or equal to the number of resources required for TB transmission exist.

And/or, for example, a transmitting UE may (preferentially) use a transmission resource selectable on a current (sub) selection window for TB transmission. And, for example, a transmitting UE may select the remaining number of transmission resources required for TB transmission from selectable transmission resources on a subsequent (sub) selection window. For example, a transmitting UE may perform TB transmission using selectable transmission resources on a current (sub) selection window, and a transmitting UE may perform the remaining TB transmission using the remaining number of transmission resources selected from among the selectable transmission resources on a subsequent (sub) selection window.

And/or, for example, a transmitting UE may omit a TB transmission. For example, a transmitting UE may not perform TB transmission.

3. Rule C

For example, the size of the sub-selection window may be configured to a minimum value among (A) and (B).

(A) A value obtained by dividing a PDB (Packet Delay Budget)-based selection window by the number of transmission resources required for TB transmission (B) A maximum time gap value (between resources) that can be specified/signaled through one SCI According to an embodiment of the present disclosure, an operation in which a specific TB-related transmission resource is reserved by another TB-related SCI may be disabled. For example, a transmission resource may include an initial transmission resource and/or a retransmission resource. For example, a transmitting UE may not be able to reserve a second TB-related transmission resource through SCI used to reserve a first TB-related transmission resource. In this case, for example, it may be configured for a transmitting UE so that a field related to resource reservation period information does not exist on SCI. And/or, for example, it may be configured for a transmitting UE so that a field related to information on the number of remaining (periodic) reserved resources does not exist on SCI.

And/or, for example, a field related to resource reservation period information and/or a field related to information on the number of remaining (periodic) reserved resources may be configured for a transmitting UE to have a predetermined specific value. For example, to make the SCI payload size when an operation for which a specific TB-related transmission resource is reserved by another TB-related SCI is disabled and the SCI payload size when an operation in which a specific TB-related transmission resource is reserved by another TB-related SCI is enabled equal, a field related to resource reservation period information and/or a field related to information on the number of remaining (periodic) reserved resources may be configured for a transmitting UE to have a predetermined specific value.

Figure 21:
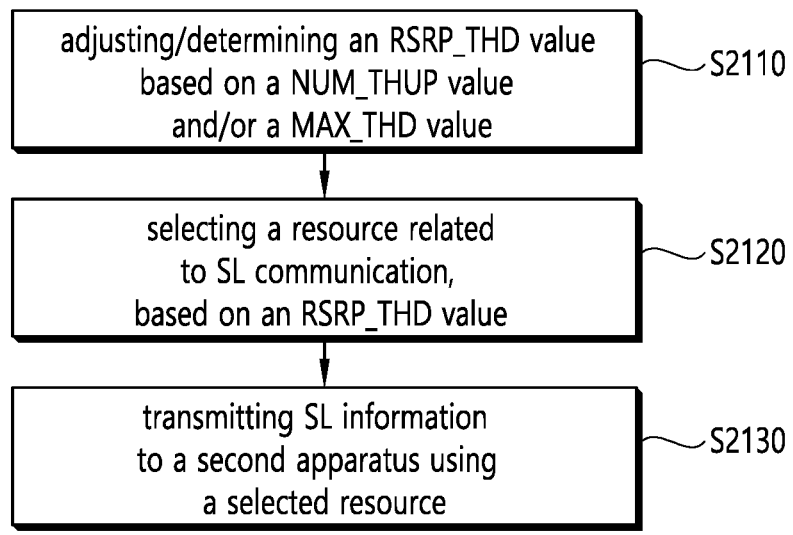
FIG. 21 shows a method for a first apparatus 100 to select a resource, according to an embodiment of the present disclosure.

FIG. 21 shows a method for a first apparatus 100 to select a resource, according to an embodiment of the present disclosure. The embodiment of FIG. 21 may be combined with various methods and/or procedures proposed according to various embodiments of the present disclosure. In the embodiment of FIG. 21, an operation order may be changed.

Referring to FIG. 21, in step S2110, a first apparatus 100 may adjust/determine an RSRP_THD value based on a NUM_THUP value and/or a MAX_THD value. For example, a first apparatus 100 may adjust/determine an RSRP_THD value based on a NUM_THUP value and/or a MAX_THD value according to various embodiments of the present disclosure. For example, according to various embodiments of the present disclosure, a NUM_THUP value and/or a MAX_THD value may be configured/adjusted/determined.

In step S2120, a first apparatus 100 may select a resource related to SL communication based on an RSRP_THD value. For example, a first apparatus 100 may select a resource related to SL communication according to various embodiments of the present disclosure.

In step S2130, a first apparatus 100 may transmit SL information to a second apparatus 200 using a selected resource.

The above-described embodiment may be applied to various apparatuses to be described below. For example, a processor 102 of a first apparatus 100 may adjust/determine an RSRP_THD value based on a NUM_THUP value and/or a MAX_THD value. In addition, a processor 102 of a first apparatus 100 may select a resource related to SL communication based on an RSRP_THD value. In addition, a processor 102 of a first apparatus 100 may control a transceiver 106 to transmit SL information to a second apparatus 200 using a selected resource.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
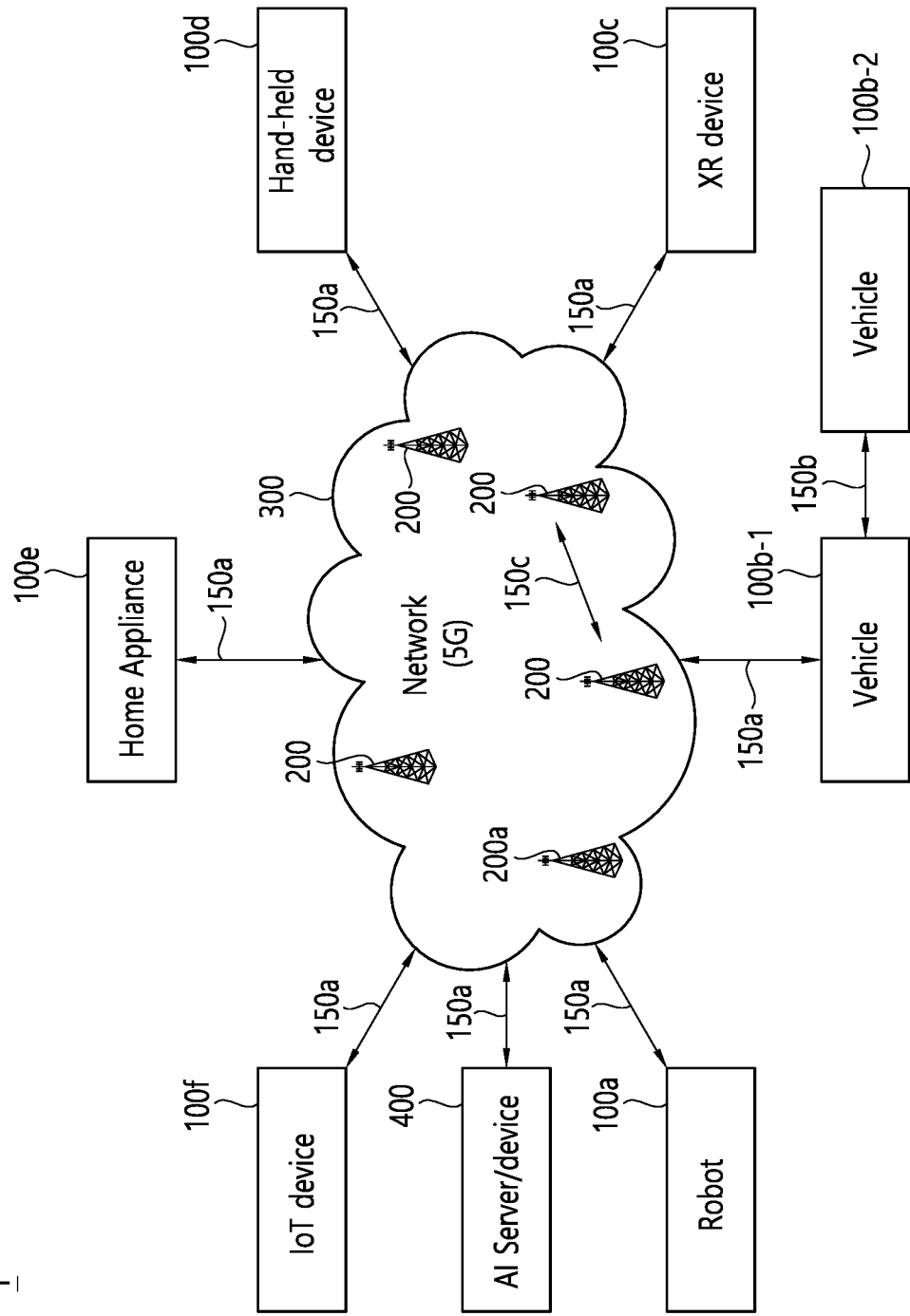
FIG. 22 shows a communication system 1, in accordance with an embodiment of the present disclosure.

FIG. 22 shows a communication system 1, in accordance with an embodiment of the present disclosure.

Referring to FIG. 22, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
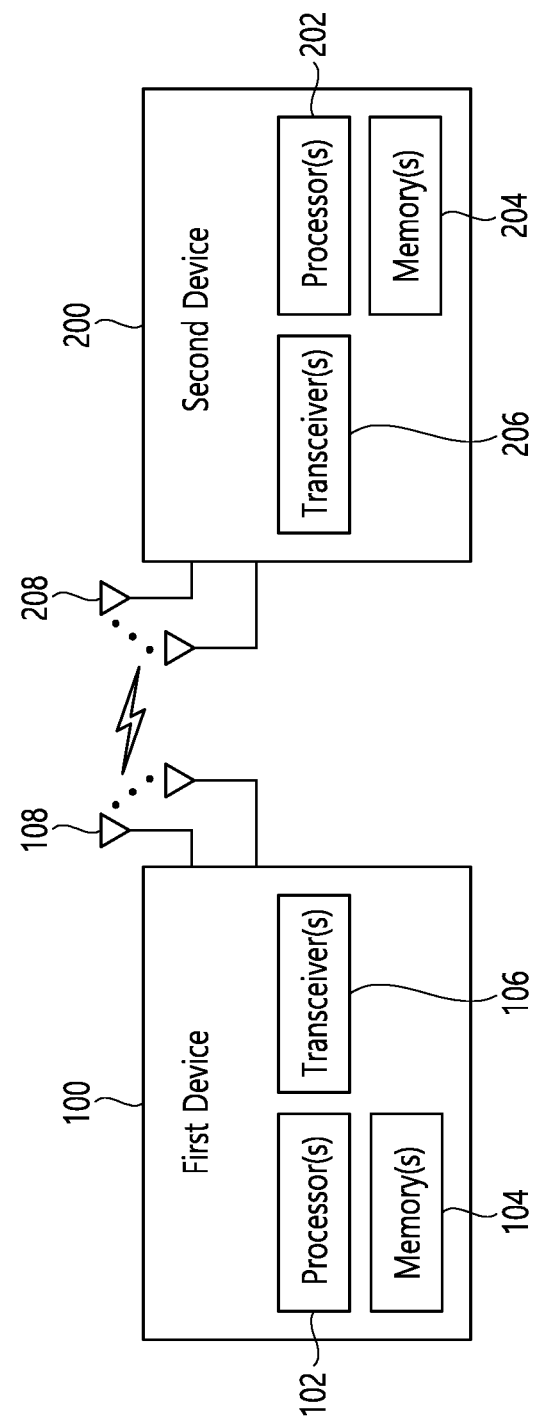
FIG. 23 shows wireless devices, in accordance with an embodiment of the present disclosure.

FIG. 23 shows wireless devices, in accordance with an embodiment of the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 24:
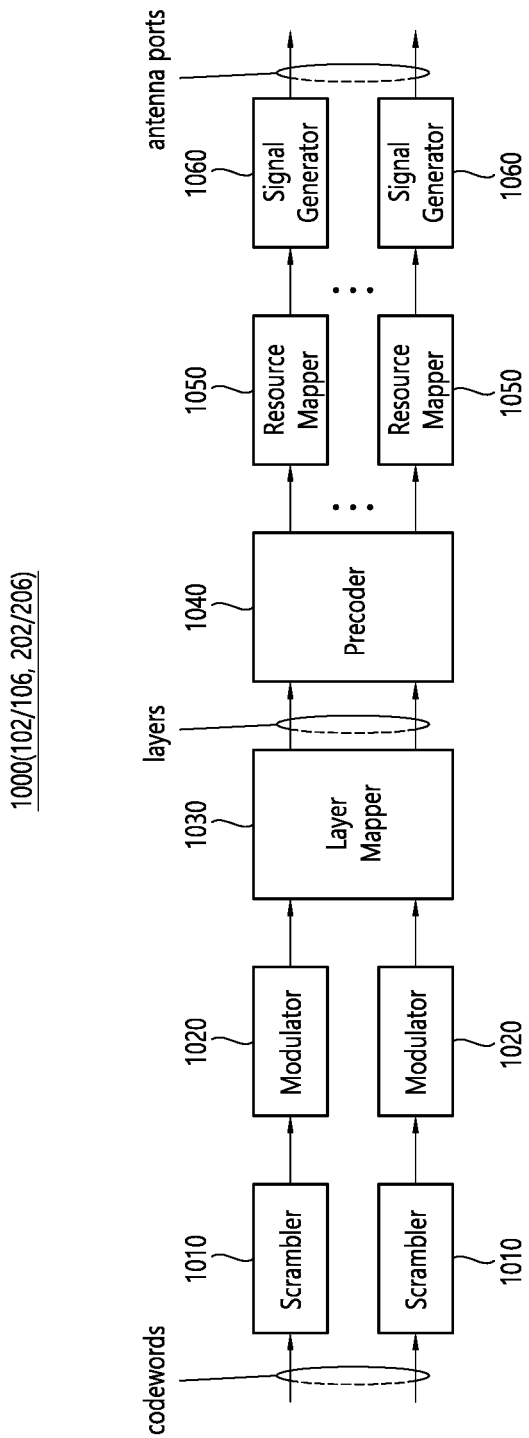
FIG. 24 shows a signal process circuit for a transmission signal, in accordance with an embodiment of the present disclosure.

FIG. 24 shows a signal process circuit for a transmission signal, in accordance with an embodiment of the present disclosure.

Referring to FIG. 24, a signal processing circuit 1000 may include scramblers 1010, modulators 1020, a layer mapper 1030, a precoder 1040, resource mappers 1050, and signal generators 1060. An operation/function of FIG. 24 may be performed, without being limited to, the processors 102 and 202 and/or the transceivers 106 and 206 of FIG. 23. Hardware elements of FIG. 24 may be implemented by the processors 102 and 202 and/or the transceivers 106 and 206 of FIG. 23. For example, blocks 1010 to 1060 may be implemented by the processors 102 and 202 of FIG. 23. Alternatively, the blocks 1010 to 1050 may be implemented by the processors 102 and 202 of FIG. 23 and the block 1060 may be implemented by the transceivers 106 and 206 of FIG. 23.

Codewords may be converted into radio signals via the signal processing circuit 1000 of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 24. For example, the wireless devices (e.g., 100 and 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
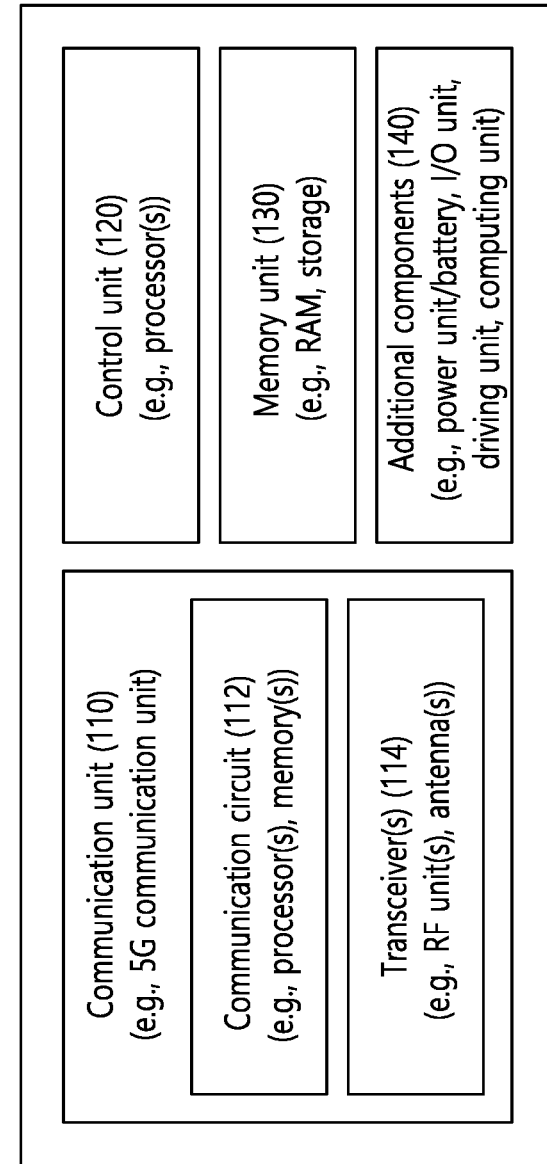
FIG. 25 shows a wireless device, in accordance with an embodiment of the present disclosure.

FIG. 25 shows another example of a wireless device, in accordance with an embodiment of the present disclosure. The wireless device may be implemented in various forms according to a use-case/service (refer to FIG. 22).

Referring to FIG. 25, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
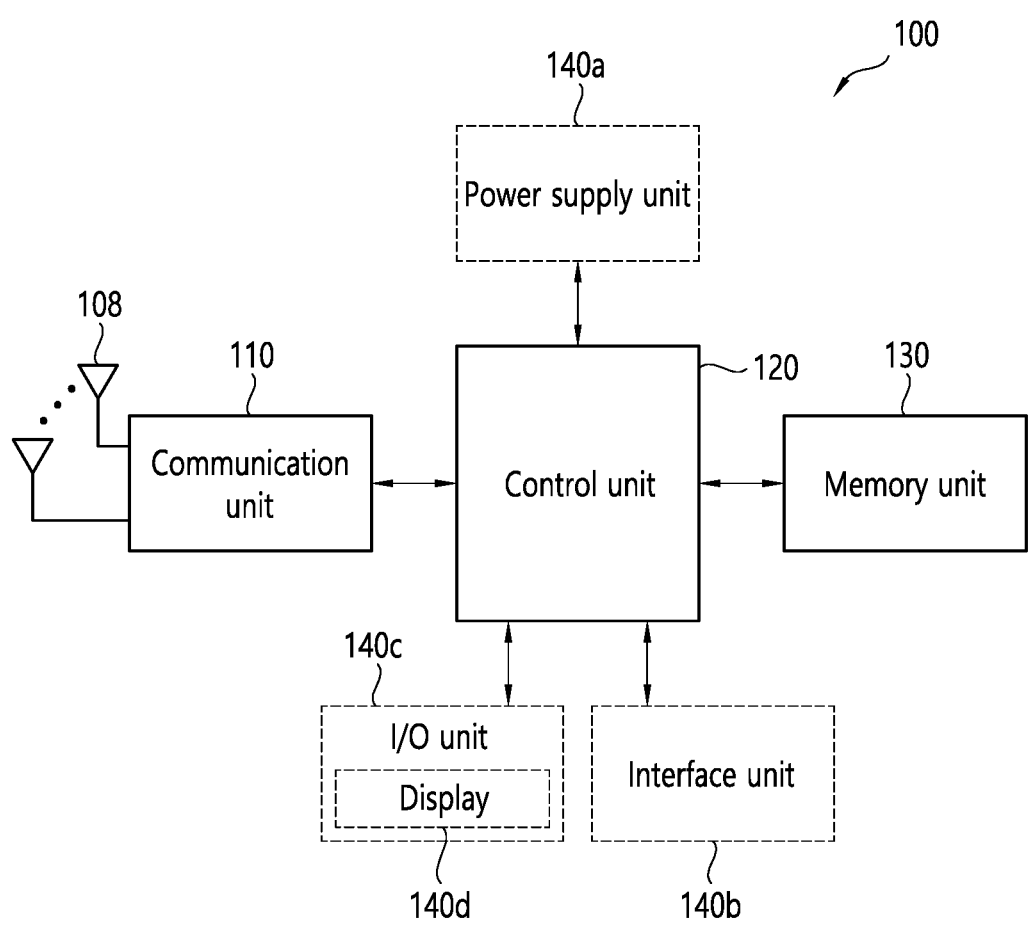
FIG. 26 shows a hand-held device, in accordance with an embodiment of the present disclosure.

FIG. 26 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 25, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130.

The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 27:
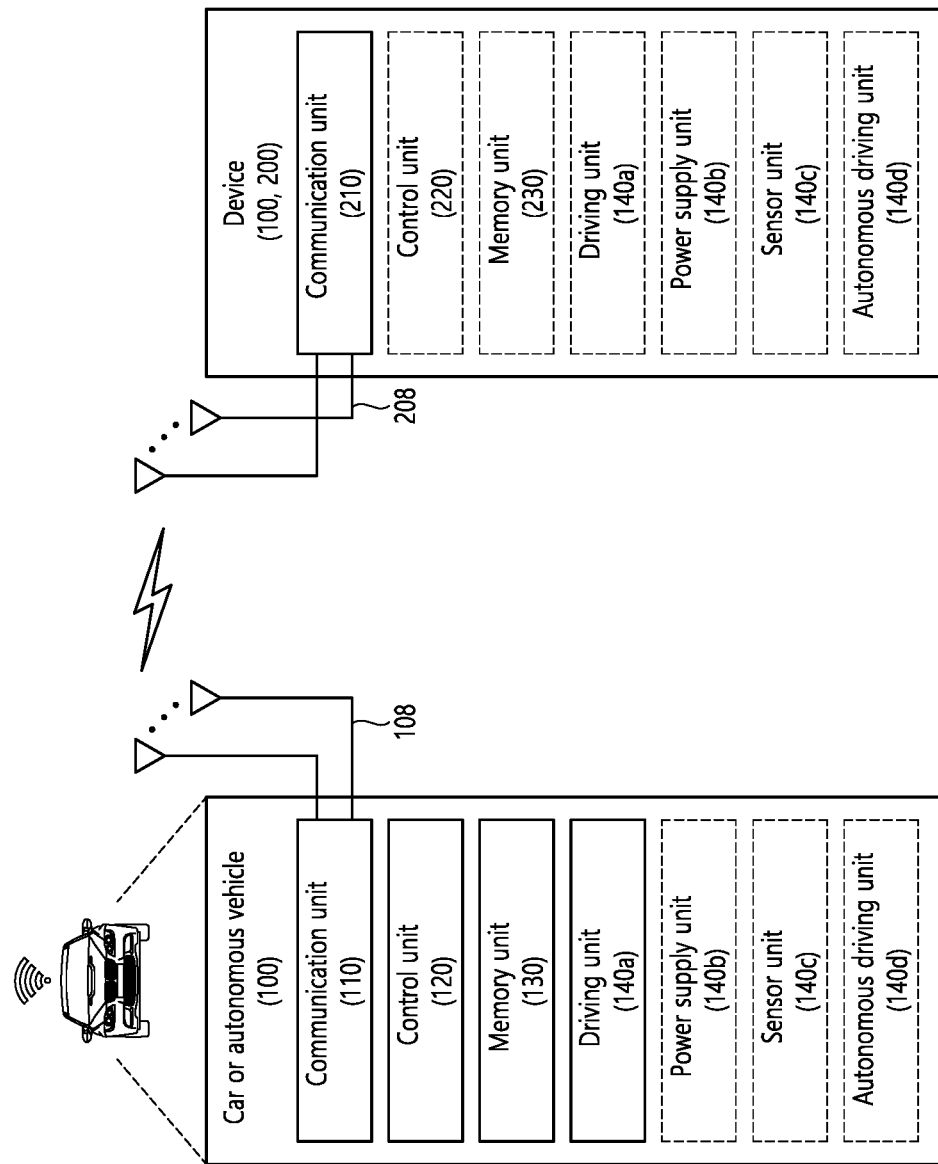
FIG. 27 shows a car or an autonomous vehicle, in accordance with an embodiment of the present disclosure.

FIG. 27 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 27, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, wireless communication, the method comprising:

selecting a first resource, a second resource, a third resource, and a fourth resource;

transmitting inter-apparatus control information to a second apparatus through an inter-apparatus physical control channel, based on at least one of the first resource, the second resource, the third resource, or the fourth resource; and transmitting an inter-apparatus physical shared channel to the second apparatus, based on at least one of the first resource, the second resource, the third resource, or the fourth resource, wherein the SCI includes information related to a first time gap and a second time gap, wherein the first resource, the second resource, the third resource, and the fourth resource are selected based on the first time gap and the second time gap, wherein the first time gap is smaller than the second time gap, wherein the first resource includes 2 or more slots related to the first resource, wherein the second resource includes 2 or more slots related to the second resource, wherein the third resource includes 2 or more slots related to the third resource, wherein the fourth resource includes 2 or more slots related to the fourth resource, wherein a 1st slot among the 2 or more slots related to the first resource precedes a 1st slot among the 2 or more slots related to the second resource by the first time gap, wherein a 1st slot among the 2 or more slots related to the third resource precedes a 1st slot among the 2 or more slots related to the fourth resource by the first time gap, and wherein the 1st slot among the 2 or more slots related to the first resource precedes the 1st slot among the 2 or more slots related to the third resource by the second time gap.

2. The method of claim 1, wherein the 2 or more slots related to the first resource are reserved adjacent to each other, wherein the 2 or more slots related to the second resource are reserved adjacent to each other, wherein the 2 or more slots related to the third resource are reserved adjacent to each other, and wherein the 2 or more slots related to the fourth resource are reserved adjacent to each other.

3. The method of claim 2, wherein a time gap between a last slot among the 2 or more slots related to the first resource and a last slot among the 2 or more slots related to the second resource is signaled together while performing the resource reservation.

4. The method of claim 1,
wherein a different inter-apparatus physical control channel is transmitted through each slot included in the 2 or more slots related to the first resource,
wherein a different inter-apparatus physical control channel is transmitted through each slot included in the 2 or more slots related to the second resource,
wherein a different inter-apparatus physical control channel is transmitted through each slot included in the 2 or more slots related to the third resource, and
wherein a different inter-apparatus physical control channel is transmitted through each slot included in the 2 or more slots related to the fourth resource.

5. The method of claim 1, wherein the 1st slot among the 2 or more slots related to the first resource precedes 1st slot among the 2 or more slots related to the second resource by the first time gap,
wherein the 1st slot among the 2 or more slots related to the first resource precedes the 1st slot among the 2 or more slots related to the third resource by the second time gap,
wherein there is a third time gap between each slot included in the 2 or more slots related to the first resource,
wherein all of the 2 or more slots related to the first resource precedes the 1st slot among the 2 or more slots related to the third resource,
wherein there is the third time gap between each slot included in the 2 or more slots related to the second resource,
wherein all of the 2 or more slots related to the second resource precedes the 1st slot among the 2 or more slots related to the third resource, and
wherein the third time gap is greater than the first time gap.

6. The method of claim 5, wherein 1st slot among the 2 or more slots related to the third resource precedes 1st slot among the 2 or more slots related to the first resource by the first time gap,
wherein there is the third gap between each slot included in the 2 or more slots related to the third resource, and
wherein there is the third gap between each slot included in the 2 or more slots related to the fourth resource.

7. The method of claim 5, wherein the third time gap is twice the first time gap.

8. The method of claim 5, wherein the third time gap is a sum of twice the first time gap and a delta value, and
wherein the delta value is signaled together while performing the resource reservation.

9. The method of claim 1,
wherein the inter-apparatus control information is related to a transmission block transmitted through the inter-apparatus communication,
wherein the first resource, the second resource, the third resource, and the fourth resource:
does not exceed a packet delay budget related to the transmission block; and
does not exceed a maximum number of transmission.

10. A first apparatus for performing wireless communication, the first apparatus comprising:
one or more memories storing instructions;
one or more transceivers; and
one or more processors connected to the one or more memories and the one or more transceivers, wherein the one or more processors execute the instructions to:
select a first resource, a second resource, a third resource, and a fourth resource;
transmit apparatus control information to a second apparatus through an inter-apparatus physical control channel, based on at least one of the first resource, the second resource, the third resource, or the fourth resource; and
transmit an inter-apparatus physical shared channel to the second apparatus, based on at least one of the first resource, the second resource, the third resource, or the fourth resource,
wherein the inter-apparatus control information SCI-includes information related to a first time gap and a second time gap,
wherein the first resource, the second resource, the third resource, and the fourth resource are selected based on the first time gap and the second time gap,
wherein the first time gap is smaller than the second time gap,
wherein the first resource includes 2 or more slots related to the first resource,
wherein the second resource includes 2 or more slots related to the second resource,
wherein the third resource includes 2 or more slots related to the third resource,
wherein the fourth resource includes 2 or more slots related to the fourth resource,
wherein a 1st slot among the 2 or more slots related to the first resource precedes a 1st slot among the 2 or more slots related to the second resource by the first time gap,
wherein a 1st slot among the 2 or more slots related to the third resource precedes a 1st slot among the 2 or more slots related to the fourth resource by the first time gap, and
wherein the 1st slot among the 2 or more slots related to the first resource precedes the 1st slot among the 2 or more slots related to the third resource by the second time gap.

11. An apparatus configured to control a first user equipment (UE), the apparatus comprising:
one or more processors; and
one or more memories operably connectable to the one or more processors and storing instructions, wherein the one or more processors execute the instructions to:
select a first resource, a second resource, a third resource, and a fourth resource;
transmit inter-UE control information to a second UE through an inter-UE physical control channel, based on at least one of the first resource, the second resource, the third resource, or the fourth resource; and
transmit an inter-UE physical shared channel to the second UE, based on at least one of the first resource, the second resource, the third resource, and or fourth resource,
wherein the inter-UE control information includes information related to a first time gap and a second time gap,
wherein the first resource, the second resource, the third resource, and the fourth resource are selected based on the first time gap and the second time gap,
wherein the first time gap is smaller than the second time gap, wherein the first resource includes 2 or more slots related to the first resource,
wherein the second resource includes 2 or more slots related to the second resource,
wherein the third resource includes 2 or more slots related to the third resource,
wherein the fourth resource includes 2 or more slots related to the fourth resource,
wherein a 1st slot among the 2 or more slots related to the first resource precedes a 1st slot among the 2 or more slots related to the second resource by the first time gap,
wherein a 1st slot among the 2 or more slots related to the third resource precedes a 1st slot among the 2 or more slots related to the fourth resource by the first time gap, and
wherein the 1st slot among the 2 or more slots related to the first resource precedes the 1st slot among the 2 or more slots related to the third resource by the second time gap.

* * * * *